United States Patent
Mecca et al.

(10) Patent No.: US 12,187,924 B2
(45) Date of Patent: *Jan. 7, 2025

(54) POLYORGANOSILOXANE HAVING POLY(METH)ACRYLATE GROUPS AND METHODS FOR THE PREPARATION AND USE THEREOF

(71) Applicants: Dow Silicones Corporation, Midland, MI (US); Dow Global Technologies LLC, Midland, MI (US)

(72) Inventors: Jodi Mecca, Midland, MI (US); Nanguo Liu, Midland, MI (US); Eric Joffre, Midland, MI (US); Randy Schmidt, Midland, MI (US); Beth Kelley, Midland, MI (US); Tim Mitchell, Midland, MI (US); James Walker, Midland, MI (US); Wesley Sattler, Collegeville, PA (US); Bryan McCulloch, Collegeville, PA (US); Tzu-Chi Kuo, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/306,312

(22) Filed: Apr. 25, 2023

(65) Prior Publication Data

US 2023/0312835 A1 Oct. 5, 2023

Related U.S. Application Data

(63) Continuation of application No. 17/299,537, filed as application No. PCT/US2020/022526 on Mar. 13, 2020, now Pat. No. 11,697,714.

(60) Provisional application No. 62/818,131, filed on Mar. 14, 2019.

(51) Int. Cl.
| | | |
|---|---|---|
| *C09J 183/10* | (2006.01) | |
| *C08G 77/08* | (2006.01) | |
| *C08G 77/12* | (2006.01) | |
| *C08G 77/20* | (2006.01) | |
| *C08G 77/442* | (2006.01) | |
| *C09J 7/38* | (2018.01) | |
| *C08G 77/00* | (2006.01) | |

(52) U.S. Cl.
CPC ............ *C09J 183/10* (2013.01); *C08G 77/08* (2013.01); *C08G 77/12* (2013.01); *C08G 77/20* (2013.01); *C08G 77/442* (2013.01); *C09J 7/38* (2018.01); *C08G 77/70* (2013.01); *C09J 2301/302* (2020.08); *C09J 2301/414* (2020.08); *C09J 2483/00* (2013.01)

(58) Field of Classification Search
CPC ......... C08G 77/08; C08G 77/42; C08G 77/20
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,645,992 A | 2/1972 | Elston |
| 3,814,730 A | 6/1974 | Karstedt et al. |
| 3,989,668 A | 11/1976 | Lee et al. |
| 4,076,698 A | 2/1978 | Anderson et al. |
| 4,177,200 A | 12/1979 | Razzano et al. |
| 4,370,358 A | 1/1983 | Hayes et al. |
| 4,584,355 A | 4/1986 | Blizzard et al. |
| 4,585,669 A | 4/1986 | Eckberg |
| 4,585,836 A | 4/1986 | Homan et al. |
| 4,587,137 A | 5/1986 | Eckberg |
| 4,591,622 A | 5/1986 | Blizzard et al. |
| 4,707,531 A | 11/1987 | Shirahata |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,099,051 A | 3/1992 | Beck et al. |
| 5,175,325 A | 12/1992 | Brown et al. |
| 5,202,190 A | 4/1993 | Kantner et al. |

(Continued)

FOREIGN PATENT DOCUMENTS

| | | | |
|---|---|---|---|
| EP | 421588 A | * 4/1991 | .......... C08F 283/122 |
| EP | 0347895 | 11/1993 | |

(Continued)

OTHER PUBLICATIONS

Agina, "Polymer Surface Engineering for Efficient Printing of Highly Conducitve Metal Nanoparticle Inks", ACS Applied Materials & Interfaces, 2015, vol. 22, pp. 11755-11764.

Manual of Patent Examining Procedure Ninth Edition, 2018, sec. 2111.03 I., II., and III.

(Continued)

*Primary Examiner* — Marc S Zimmer

(74) *Attorney, Agent, or Firm* — Catherine U. Brown

(57) ABSTRACT

A polydiorganosiloxane having both a silicon bonded aliphatically unsaturated group and a silicon bonded poly(meth)acrylate polymer or copolymer, and method for preparation of this polydiorganosiloxane are disclosed. The method preserves the aliphatically unsaturated groups when grafting the poly(meth)acrylate to the polydiorganosiloxane. This polydiorganosiloxane is useful in hydrosilylation reaction curable compositions, such as pressure sensitive adhesive compositions.

12 Claims, 2 Drawing Sheets

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,310,843 A | 5/1994 | Morita |
| 5,457,220 A | 10/1995 | Razzano |
| 5,481,014 A | 1/1996 | Graiver et al. |
| 5,582,923 A | 12/1996 | Kale et al. |
| 6,239,246 B1 | 5/2001 | Takahashi et al. |
| 6,541,109 B1 | 4/2003 | Kumar et al. |
| 6,562,324 B1 | 5/2003 | Kumar et al. |
| 6,733,884 B2 | 5/2004 | Brown |
| 6,743,507 B2 | 6/2004 | Barlow et al. |
| 7,897,689 B2 | 3/2011 | Harris et al. |
| 8,258,243 B2 | 9/2012 | Yamada et al. |
| 8,580,862 B2 | 11/2013 | Barnes et al. |
| 9,052,440 B2 | 6/2015 | Kuyu et al. |
| 9,718,999 B2 * | 8/2017 | Kouno .................. C09J 171/02 |
| 2002/0035186 A1 | 3/2002 | Ona et al. |
| 2005/0124821 A1 | 6/2005 | Korth et al. |
| 2010/0130693 A1 | 5/2010 | Yamada et al. |
| 2012/0095159 A1 | 4/2012 | Liu et al. |
| 2014/0228570 A1 | 8/2014 | Brandstadt et al. |
| 2017/0129983 A1 | 5/2017 | Alli et al. |
| 2019/0023895 A1 | 1/2019 | Harris et al. |
| 2019/0031924 A1 * | 1/2019 | Malik .................. C08G 83/005 |

FOREIGN PATENT DOCUMENTS

| | | | |
|---|---|---|---|
| EP | 931806 A1 * | 1/1999 | ........... C08G 77/442 |
| EP | 1277766 | 1/2003 | |
| JP | 2005325253 A * | 11/2005 | |
| JP | 7078088 | 5/2022 | |
| WO | 2007145996 | 12/2007 | |
| WO | 2008081913 | 7/2008 | |
| WO | WO-2011152002 A1 * | 12/2011 | ........... C08G 65/336 |
| WO | 2018049555 | 3/2018 | |
| WO | 2020186127 | 9/2020 | |
| WO | 2020186129 | 9/2020 | |

OTHER PUBLICATIONS

Pettersen, "The Chemical Composition of Wood", U.S. Department of Agriculture, Forest Service, Forest Products Laboratory, Chapter 2.

U.S. Appl. No. 63/012,293, filed Apr. 20, 2020.

* cited by examiner

POLYORGANOSILOXANE HAVING POLY(METH)ACRYLATE GROUPS AND METHODS FOR THE PREPARATION AND USE THEREOF

CROSS-REFERENCE TO RELATED APPLICATIONS

This application is a Continuation which claims priority under 35 U.S.C. § 120 to, and all advantages of, U.S. patent application Ser. No. 17/299,537 filed on 13 Mar. 2020, which claims priority under 35 U.S.C. § 371 to, and all advantages of, International Application No. PCT/US2020/022526 filed on 13 Mar. 2020, which claims the benefit of U.S. Provisional Patent Application No. 62/818,131 filed 14 Mar. 2019 under 35 U.S.C. § 119 (e). U.S. patent application Ser. No. 17/299,537; International Application No. PCT/US2020/022526; and U.S. Provisional Patent Application No. 62/818,131 are hereby incorporated by reference.

TECHNICAL FIELD

A polyorganosiloxane having a silicon bonded poly(meth)acrylate group (hereinafter, "poly(meth)acrylate grafted polyorganosiloxane") is disclosed. A method for making poly(meth)acrylate grafted polyorganosiloxanes is also disclosed.

BACKGROUND

Acrylic chains can be incorporated onto polydimethylsiloxane backbones using free-radical polymerization by performing the polymerization in the presence of mercapto-functional polydimethylsiloxanes. The mercapto group will act as a chain-transfer agent and enable acrylic chains to be grafted onto the polydimethylsiloxane chain as pendant and/or end groups. However, if a mercapto-functional polydimethylsiloxane also contained vinyl or other aliphatically unsaturated monovalent hydrocarbyl functionality, the system may become saturated or crosslinked due to reaction of the aliphatically unsaturated groups during the free radical polymerization. Furthermore, as chain-transfer is a kinetically controlled process, grafting efficiency may be low due to the low level of mercapto-functionalization.

SUMMARY

A polyorganosiloxane having a poly(meth)acrylate group (hereinafter, "poly(meth)acrylate grafted polyorganosiloxane") comprises unit formula: $[R^3_w(R^5-S-R")(OR^4)_{(2-w)}Si-O_{1/2}]_p[R^3_v(R^5-S-R")(OR^4)_{(1-v)}Si-O_{2/2}]_q$ $[(R^5-S-R")Si-O_{3/2}]_k$ $(R^6R^7_2SiO_{1/2})_r(R^7_2SiO_{2/2})_s$ $(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a poly(meth)acrylate polymer or copolymer, each $R^6$ is an independently selected aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥2, and a quantity (p+q+k+r+s+t+u) is sufficient to provide a molecular weight of at least 50 kDa to the poly(meth)acrylate grafted polyorganosiloxane.

A method for making a product comprising a poly(meth)acrylate grafted polyorganosiloxane comprises:
1) combining starting materials comprising:
    an alkoxysilyl-functional (meth)acrylate macromonomer;
    a polydiorganosiloxane selected from the group consisting of
        an unsaturated polydiorganosiloxane having, per molecule, at least one silicon bonded aliphatically unsaturated group,
        a hydroxyl functional polydiorganosiloxane, and
        a combination of both the unsaturated polydiorganosiloxane and the hydroxyl functional polydiorganosiloxane; and
    a condensation reaction catalyst;
    thereby making the product comprising the poly(meth)acrylate grafted polyorganosiloxane and a by-product comprising water and/or an alcohol; and
II) removing all or a portion of the by-product during and/or after step 1).

BRIEF DESCRIPTION OF THE DRAWINGS

In FIG. 2, a bis-vinyl-terminated polydimethylsiloxane, a bis-hydroxyl terminated polydimethylsiloxane, and the alkoxysilyl-functional (meth)acrylate macromonomer prepared in Scheme 1 in FIG. 1 are reacted in the presence of a phosphazene catalyst and solvent (toluene) to form a poly(meth)acrylate grafted polyorganosiloxane.

DETAILED DESCRIPTION

Figure 1:
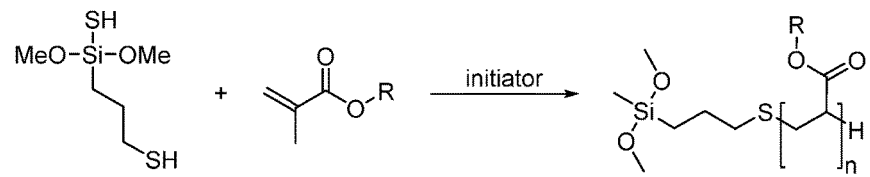
FIG. 1 shows a representative example of Scheme 1 in which a (meth)acrylate polymer is grown off a thiol-functionality after a hydrogen atom is abstracted either from a free radical initiator fragment or a growing chain. The (meth)acrylate oligomer is then terminated/endcapped with a hydrogen atom from a different thiol molecule, thereby forming an alkoxysilyl-functional (meth)acrylate macromonomer. This is described below in Reference Example A.
Figure 2:
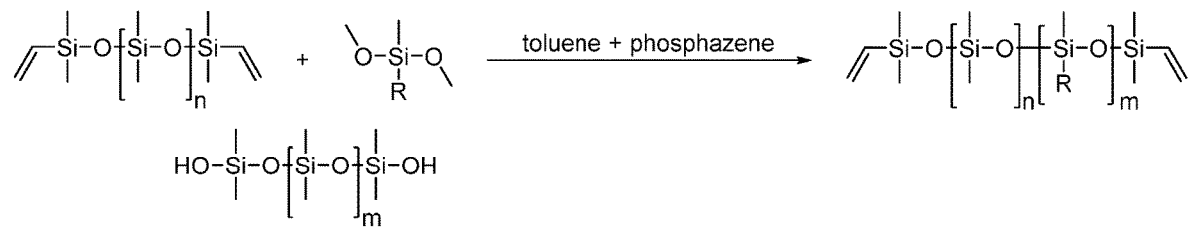
FIG. 2 shows a representative example of Scheme 2 for making a poly(meth)acrylate grafted polyorganosiloxane described below in Reference Example B.

A method is disclosed for making a product comprising a poly(meth)acrylate grafted polyorganosiloxane. The method comprises:
I) combining starting materials comprising:
    A) an alkoxysilyl-functional (meth)acrylate macromonomer;
    B) a polydiorganosiloxane selected from the group consisting of B1) an unsaturated polydiorganosiloxane having, per molecule, at least one silicon bonded aliphatically unsaturated group;
B2) a hydroxyl-functional polydiorganosiloxane having, per molecule, at least two silicon bonded hydroxyl groups, and
B3) a combination of B1) and B2);
C) a condensation reaction catalyst;
optionally D) a polydialkylsiloxane; and
optionally E) a solvent; thereby making the product comprising the poly(meth)acrylate grafted polyorganosiloxane and a by-product;
II) removing all or a portion of the by-product during and/or after step I);
optionally III) neutralizing the product; and
optionally IV) recovering the poly(meth)acrylate grafted polyorganosiloxane.

Step I) in the method may be performed by any convenient means such as mixing. Step I) may be performed under inert conditions, e.g., nitrogen or other inert gas.
Combining the starting materials may be performed at elevated temperature, e.g., heating at 80° C. to 120° C. Solvent may optionally be added, e.g., to facilitate combining the starting materials. Combining the starting materials may be performed with any order of addition, for example combining A) the alkoxysilyl-functional (meth)acrylate macromonomer, B) the polydiorganosiloxane (e.g., either or both of B1) the unsaturated polydiorganosiloxane, and B2) the hydroxyl-functional polydiorganosiloxane) and/or D) the polydialkylsiloxane. The resulting mixture may then be heated, and thereafter, C) the condensation reaction catalyst may be added, optionally dissolved in E) the solvent. Without wishing to be bound by theory, it is thought that adding E) the solvent may be beneficial to make a poly (meth)acrylate grafted polyorganosiloxane with high MW. When the starting materials react, a by-product is produced. The by-product may comprise water and/or alcohol (such as methanol). All or a portion of the by-product may be removed during and/or after step I). Without wishing to be bound by theory, it is thought that removing by-product may drive the reaction to completion and/or facilitate increasing MW. By-product may be removed by any convenient means, such as stripping.

Step III) in the method is neutralizing the product. Neutralizing may be performed by adding F) a neutralizing agent to the product during or after step II). Neutralizing may be performed at ambient or elevated temperature. Step IV) in the method is recovering the poly(meth)acrylate grafted polyorganosiloxane. Recovering the poly(meth)acrylate grafted polyorganosiloxane may be performed by any convenient means, such as filtration, stripping, and/or distillation. The starting materials used in the method described above are as follows.

Starting material A), the alkoxysilyl-functional (meth) acrylate macromonomer used in the method described above may have formula A-1):

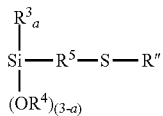

where each $R^3$ is an independently selected monovalent hydrocarbon group; each $R^4$ is an independently selected alkyl group; $R^5$ is a divalent hydrocarbon group; R" is a (meth)acrylate polymer or copolymer, and subscript a is 0, 1 or 2. R" may have a DP of 1 to 1,000, and alternatively 5 to 600. Alternatively, the alkoxysilyl-functional (meth)acrylate macromonomer may have formula A-2):

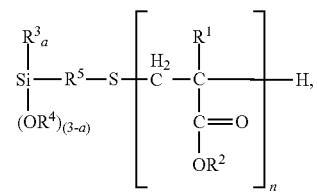

where each $R^1$ is independently selected from the group consisting of hydrogen and an alkyl group; $R^2$ is independently selected from the group consisting of hydrogen, an alkyl group, an aryl group, and an aralkyl group; subscript n is 1 to 1,000; and $R^3$, $R^4$, and $R^5$ are as described above.

Alternatively, in formula A-2), subscript n may be 5 to 600. Suitable alkyl groups for $R^1$ may be alkyl groups of 1 to 4 carbon atoms; alternatively methyl or ethyl. Alternatively, each $R^1$ may be methyl. Suitable alkyl groups for $R^2$ may have 1 to 18 carbon atoms, alternatively 1 to 8 carbon atoms. Suitable alkyl groups for $R^2$ include methyl, ethyl, propyl, and butyl. Suitable aryl groups for $R^2$ have 6 to 18 carbon atoms and include phenyl, and suitable aralkyl groups for $R^2$ have 6 to 18 carbon atoms and include styryl. Alternatively, in formula A-2) each $R^2$ may be an independently selected alkyl group of 1 to 18 carbon atoms, alternatively 1 to 8 carbon atoms.

Alternatively, in formulae A-1) and A-2), subscript a may be 1 or 2, alternatively 1, and alternatively 2. Each $R^3$ may be an independently selected monovalent hydrocarbon group of 1 to 18 carbon atoms. Suitable monovalent hydrocarbon groups for $R^3$ include alkyl groups (e.g., methyl, ethyl, propyl and butyl) and alkenyl groups (e.g., vinyl, allyl and hexenyl), aryl groups such as phenyl, and aralkyl groups such as benzyl, tolyl, xylyl, and phenylethyl. Alternatively, each $R^3$ may be independently selected from the group consisting of alkyl and alkenyl. Alternatively, each $R^3$ may be an alkyl group of 1 to 8 carbon atoms. Alternatively, each $R^3$ may be selected from the group consisting of methyl and vinyl.

Each $R^4$ may be an independently selected alkyl group of 1 to 6 carbon atoms. Suitable alkyl groups for $R^4$ include methyl, ethyl, propyl, and butyl; alternatively methyl.

Each $R^5$ may be a divalent hydrocarbon group of 1 to 18 carbon atoms.

Suitable divalent hydrocarbon groups for $R^5$ include alkylene groups such as ethylene ($-CH_2-CH_2-$), propylene such as $-CH_2-CH_2-CH_2-$ or $-CH(CH_3)CH_2-$), butylene, or hexylene; an arylene group such as phenylene, or an alkarylene group such as:

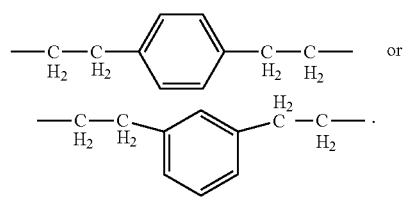

Alternatively, $R^5$ may be an alkylene group of 2 to 6 carbon atoms, such as propylene.

The amount of starting material A) used in the method for making the product comprising the poly(meth)acrylate grafted polyorganosiloxane described above depends on various factors, however, starting material A) may be used in an amount of 4% to 11% based on combined weights of starting materials A) and B) in the method. Alternatively, the amount of starting material A) may be 1% to 50%, alternatively 5% to 10%, alternatively 5% to 9%, on the same basis.

Alkoxysilyl-functional (meth)acrylate monomers suitable for use as starting material A) may be prepared by known methods, such as that disclosed in U.S. Pat. No. 6,733,884 to Brown. Alternatively, the alkoxysilyl-functional (meth)acrylate may be prepared by a method comprising:

1) combining starting materials comprising
   i) a (meth)acrylate monomer of formula

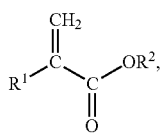

where $R^1$ and $R^2$ are as described above;
   ii) a mercapto-functional alkoxysilane of formula

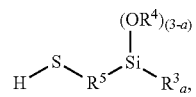

where $R^3$, $R^4$, $R^5$ and subscript a are as described above;
   optionally iii) a free radical initiator; and
   optionally iv) a solvent; thereby making a product comprising an alkoxysilyl-functional (meth)acrylate macromonomer; and
optionally 2) recovering A) the alkoxysilyl-functional (meth)acrylate macromonomer.

In this method, i) the (meth)acrylate monomer may be combined with iv) the solvent, when present, before step 1). The solvent may optionally be dried before combining with starting material i) and/or any other starting materials. Alternatively, i) the (meth)acrylate monomer), ii) the mercapto-functional alkoxysilane, and iv) the solvent, when present, may be combined before step 1). The resulting combination may be heated, e.g., to 50° C. to 150° C. in a reactor. The reaction of starting materials i) and ii) may proceed with sufficient heating to generate free radicals. Alternatively, iii) the free radical initiator, optionally dissolved in iv) solvent, may be added to the reaction vessel. Step 1) may be performed under inert conditions, e.g., by purging the reactor with nitrogen. The starting materials in step 1) may be combined with mixing, heating, or both. For example, mixing and heating may be performed by mixing while heating from 50° C. to reflux temperature of the starting materials, alternatively 50° C. to 150° C., alternatively 50° C. to 110° C.; alternatively 50° C. to 100° C.; alternatively 75° C. to 85° C. for 1 to 6 hours. The starting materials may be added in any order, however, the iii) free radical initiator may be dissolved in iv) the solvent and optionally combined with i) the (meth)acrylate monomer, and the resulting combination may then be added into a reactor containing ii) the mercapto-functional alkoxysilane. Alternatively, i) the (meth)acrylate monomer and ii) the mercapto-functional alkoxysilane may be combined to form a mixture, and thereafter iii) the free radical initiator may be added to the mixture. Without wishing to be bound by theory, it is thought that the resulting alkoxysilyl-functional (meth)acrylate macromonomer (made with this order of addition) will have a different molecular weight distribution than when a different order of addition is used.

Step 2), recovering the alkoxysilyl-functional (meth)acrylate macromonomer may be performed by any convenient means, such as cooling the reaction product prepared in step 1) to RT, and precipitation in a non-solvent (such as an alkane such as hexanes or an alcohol such as methanol) which will precipitate the alkoxysilyl-functional (meth)acrylate macromonomer. Recovering may optionally further comprise drying the precipitate, such as by heating at ambient or reduced pressure with heat, e.g., from 80° C. to 100° C. to drive off residual monomer, solvent, or both.

In the method for preparing the alkoxysilyl-functional (meth)acrylate macromonomer starting material i) is a (meth)acrylate monomer. Suitable (meth)acrylate monomers have formula i-1):

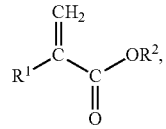

where $R^1$ and $R^2$ are as described above. Suitable (meth)acrylate monomers are known in the art and are commercially available, and some examples are shown in Table 1. The amount of starting material i) may be 20% to 99.8%, alternatively 30% to 90%, and alternatively 70% to 75% based on combined weights of starting materials i), ii), iii), and iv).

TABLE 1

Exemplary (Meth)acrylate Monomers

| Abbreviation | (Meth) Acrylate Monomer | Commercial Source |
|---|---|---|
| AA | Acrylic Acid | Millipore Sigma |
| BA | Butyl Acrylate | Millipore Sigma |
| BMA | Butyl Methacrylate | Millipore Sigma |
| EHA | 2-Ethylhexyl Acrylate | Millipore Sigma |
| EHMA | 2-Ethylhexyl Methacrylate | Millipore Sigma |
| IBA | Isobutyl Acrylate | Millipore Sigma |
| IBMA | Isobutyl Methacrylate | Millipore Sigma |
| MMA | Methyl Methacrylate | Millipore Sigma |
| MAA | Methacrylic Acid | Millipore Sigma |
| BzMA | benzyl methacrylate | Millipore Sigma |
| PMA | phenyl methacrylate | Millipore Sigma |

In the method for preparing the alkoxysilyl-functional (meth)acrylate macromonomer starting material ii) is a mercapto-functional alkoxysilane. The mercapto-functional alkoxysilane may have formula ii):

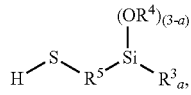

where subscript a and $R^3$, $R^4$, and $R^5$ are as described above.
Suitable mercapto-functional alkoxysilanes are known in the art and are commercially available. These include 3-mercaptopropyltrimethoxysilane, 3-mercaptopropyltriethoxysilane, 11-mercapto undecyltrimethoxysilane, (mercaptomethyl)methyldiethoxysilane, 3-mercaptopropylmethyldimethoxysilane are of which all commercially available from Gelest, Inc. of Morrisville, Pennsylvania, USA. Alternatively, mercapto-functional alkoxysilanes such as those described above as well as mercapto-functional monoalkoxysilanes, e.g., 3-mercaptopropyldimethylmethoxysilane and 3-mercaptopropyldimethylethoxysilane, may be synthesized by known methods such as those disclosed in U.S. Patent Application 2005/0124821 and Agina, E.V., ACS Applied Materials & Interfaces, 2015, 22, 11755-11764. The amount of starting material ii) may be 0.1% to 50%, alternatively 1% to 10%, and alternatively 1% to 8%, based on combined weights of starting materials i), ii), iii), and iv).

Starting material iii) for preparing the alkoxysilyl-functional (meth)acrylate macromonomer is a free radical initiator. The free radical initiator may be selected from the group consisting of iii-1) an azo compound, iii-2) a peroxide, (e.g., a hydroxyperoxide, a peracid, and a perester, such as a tert-alkyl peroxypivalate), and iii-3) a combination thereof. Suitable free radical initiators are known in the art, see for example, U.S. Pat. No. 8,258,243 col. 2, lines 9-34. Alternatively, suitable free radical initiators are commercially available. For example, tert-alkyl peroxypivalates are commercially available from Akzo Nobel, e.g., tert-amyl peroxypivalate is available as Trigonox 125-C75 and tert-butyl peroxypivalate is available as Trigonox 25-C75. The amount of starting material iii) may be 0 to 5%, alternatively 0.1% to 2%, and alternatively 1% to 2%, based on combined weights of starting materials i), ii), iii), and iv).

A solvent may be used in the method described above. One or more of the starting materials for use in making the alkoxysilyl-functional (meth)acrylate macromonomer may be dissolved in iv) a solvent before combining with the other starting materials. For example, the free radical initiator may be dissolved in mineral spirits. Alternatively, the solvent may be selected from the group consisting of iv-1) a hydrocarbon with a boiling point above 100° C. (e.g., an aromatic hydrocarbon such as toluene or xylene), iv-2) a polar solvent (such as acetone, methyl ethyl ketone, methyl acetate, ethyl acetate, acetonitrile, methanol, isopropanol or tert-butanol), iv-3) a silicone oil (e.g., the silicone oil may be a polydialkylsiloxane, as described below), and iv-4) a combination of two or more thereof. Alternatively, the solvent may be toluene, for example, to facilitate combination of starting material A) with the other starting materials to make the poly(meth)acrylate grafted polyorganosiloxane. When a polydialkylsiloxane is used as a solvent, the polydialkylsiloxane may act as a starting material in the method for making the product comprising the poly(meth)acrylate grafted polyorganosiloxane. When toluene is used, no solvent exchange may be included in the method for making the product comprising the poly(meth)acrylate grafted polyorganosiloxane. The amount of starting material iv) may be 0 to 70%, alternatively 0 to 25%, based on combined weights of starting materials i), ii), iii), and iv).

In the method for making the product comprising the poly(meth)acrylate grafted polyorganosiloxane, starting material B) is a polydiorganosiloxane. The polydiorganosiloxane is selected from the group consisting of B1) an unsaturated polydiorganosiloxane having, per molecule, at least one silicon bonded aliphatically unsaturated group, B2) a hydroxyl-functional polydiorganosiloxane having, per molecule, at least two silicon bonded hydroxyl groups, and B3) a combination of both B1) and B2). When the starting material B1) is used, the poly(meth)acrylate grafted polyorganosiloxane has both silicon bonded aliphatically unsaturated groups and silicon bonded poly(meth)acrylate groups.

Starting material B1) is an unsaturated polydiorganosiloxane having, per molecule, at least one silicon bonded aliphatically unsaturated group. The aliphatically unsaturated group may be in a terminal position, a pendant position, or both terminal and pendant positions.

Starting material B1), the unsaturated polydiorganosiloxane, may comprise unit formula B1-1): $(R^6R^7{}_2SiO_{1/2})_b$ $(R^7{}_2SiO_{2/2})_c(R^6R_7SiO_{2/2})_d(R^7{}_3SiO_{1/2})_e(R'OR^7{}_2SiO_{1/2})_f$ $(R'OR^7SiO_{2/2})_g$, where each $R^6$ is an independently selected aliphatically unsaturated hydrocarbon group, each $R^7$ is an independently selected monovalent hydrocarbon group free of aliphatic unsaturation, each R' is independently selected from the group consisting of H and $R^7$, subscript b is 0, 1, or 2, subscript c 1, subscript d 0, subscript e is 0, 1, or 2, subscript f is 0, 1, or 2, and subscript g 0, with the provisos that a quantity (b+d)≥1, a quantity (b+e+f)=2, and a quantity (b+c+d+e+f+g) is at least 3, alternatively 3 to 250.

Aliphatically unsaturated hydrocarbon groups for $R^6$ may have 2 to 18 carbon atoms and are exemplified by alkenyl, such as vinyl, allyl or hexenyl; and alkynyl, such as propynyl, butynyl or hexynyl. Alternatively, each $R^6$ may be an alkenyl group. Alternatively, each $R^6$ may be a vinyl group.

Monovalent hydrocarbon groups free of aliphatic unsaturation for $R^7$ may have 1 to 18 carbon atoms and are exemplified by alkyl groups, aryl groups, and aralkyl groups; alternatively alkyl groups and aryl groups. Suitable alkyl groups include methyl, ethyl, and propyl; alternatively methyl. Suitable aryl groups include phenyl. Alternatively, each $R^7$ may be an alkyl group, such as methyl.

Alternatively, in unit formula B1-1), subscript b may be 0 or 2, subscript e may be 0 or 2, and subscript g may be 0. Alternatively, subscript c may be 1 to 250, subscript d may be 0 to 1, subscript g may be 0 to 1, and a quantity (c+d+g) may be 1 to 250. Alternatively, the quantity (b+e) may be 2. Alternatively, subscript c may be 1 to 100, alternatively 10 to 75, alternatively 25 to 75, and alternatively 30 to 60. Alternatively, subscript d may be 0 to 50, alternatively 0 to 25 alternatively 0 to 10, alternatively 0 to 5. Alternatively, subscript g may be 0 to 50, alternatively 0 to 25 alternatively 0 to 10, alternatively 0 to 5. Subscript b is 0 to 2, alternatively subscript b may be 0, and alternatively subscript b may be 2. Subscript e is 0 to 2, alternatively subscript e may be 0, and alternatively subscript e may be 2. Subscript f is 0 to 2, alternatively subscript f may be 0, and alternatively, subscript f may be 2.

Starting material B1) may contain both silicon bonded aliphatically unsaturated hydrocarbon groups and silicon bonded hydroxyl groups. Examples of starting material B1) containing both silicon bonded aliphatically unsaturated groups and silicon bonded hydroxyl groups include an OH-terminated polymethylvinylsiloxane and an OH-terminated poly(dimethyl/methylvinyl)siloxane copolymer, which is commercially available from Gelest. See for example, "Gelest Reactive Silicones: Forging New Polymer Links", 2016, https://www.gelest.com/wp-content/uploads/Reactive-Slicones-No-Price-2016.pdf, at page 11. Alternatively, starting material B1) may have silicon bonded aliphatically unsaturated hydrocarbon groups, silicon bonded hydroxyl groups, and silicon bonded alkoxy groups. Examples of such material include DOWSIL™ 4-7042, which is a mixture of hydroxy-terminated, poly(dimethyl, methylvinyl siloxane) and alpha-hydroxy-terminated, omega-methoxy-terminated, poly(dimethyl, methylvinyl siloxane) commercially available from Dow Silicones Corporation of Midland, Michigan, USA. When starting material B1) contains both silicon bonded aliphatically unsaturated hydrocarbon groups and sufficient silicon bonded hydroxyl groups, then starting material B2) the hydroxyl-functional polydiorganosiloxane is optional.

Alternatively, in unit formula B1-1) above, a quantity (f+g) may be less than 2 (such that starting material B1) may have less than 2 silicon bonded hydroxyl groups per molecule). Examples of suitable unsaturated polydiorganosiloxanes include B-i) dimethylvinylsiloxy-terminated polydimethylsiloxane, B-ii) dimethylvinylsiloxy-terminated poly(dimethylsiloxane/methylvinylsiloxane), B-iii) dimethylvinylsiloxy-terminated polymethylvinylsiloxane, B-iv) trimethylsiloxy-terminated poly(dimethylsiloxane/methylvinylsiloxane), B-v) trimethylsiloxy-terminated polymethylvinylsiloxane, B-vi) dimethylvinylsiloxy-terminated poly(dimethylsiloxane/methylvinylsiloxane), B-vii) dimethylvinylsiloxy-terminated poly(dimethylsiloxane/methylphenylsiloxane), B-viii) dimethylvinylsiloxy-terminated poly(dimethylsiloxane/diphenylsiloxane), B-ix) phenyl,methyl,vinyl-siloxy-terminated polydimethylsiloxane, B-x) dimethylhexenylsiloxy-terminated polydimethylsiloxane, B-xi) dimethylhexenylsiloxy-terminated poly(dimethylsiloxane/methylhexenylsiloxane), B-xii) dimethylhexenylsiloxy-terminated polymethylhexenylsiloxane, B-xiii) trimethylsiloxy-terminated poly(dimethylsiloxane/methylhexenylsiloxane), B-xiv) trimethylsiloxy-terminated polymethylhexenylsiloxane B-xv) dimethylhexenyl-siloxy terminated poly(dimethylsiloxane/methylhexenylsiloxane), B-xvi) dimethylvinylsiloxy-terminated poly(dimethylsiloxane/methylhexenylsiloxane)

B-xvii) a combination thereof. Vinyl functional polydiorganosiloxanes are available, see for example, "Gelest Reactive Silicones: Forging New Polymer Links", 2016, https://www.gelest.com/wp-content/uploads/Reactive-Silicones-No-Price-2016.pdf, at pages 8-11 and 15-16. When starting material B1) does not contain sufficient silicon bonded hydroxyl groups, starting material B2) is used in the method described above. The amount of starting material B1) used in the method depends on various factors including on whether B1) has terminal, pendant, or both terminal and pendant aliphatically unsaturated groups, however, the amount of starting material B1) is sufficient to provide 0.1% to 10%, alternatively 0.1% to 2%, aliphatically unsaturated groups to all of the starting materials in step I) of the method for making the product comprising the poly(meth)acrylate grafted polyorganosiloxane. Alternatively, the amount of starting material B1) may be 0.5% to 5%, alternatively, 1% to 4%, and alternatively 1% to 3%, based on combined weights of starting materials A) and B). Alternatively, starting material B1) can be present in a higher amount, e.g., up to 90% when B1) had hydroxyl functional groups and starting material B2) is not used.

In the method for making the product comprising the poly(meth)acrylate grafted polyorganosiloxane, starting material B2) is a hydroxyl-functional polydiorganosiloxane having, per molecule, at least two silicon bonded hydroxyl groups. The hydroxyl groups may be in terminal positions, in pendant positions, or both. Starting material B2) may comprise unit formula B2-1): $(R^8_2SiO_{2/2})_h(R^8_3SiO_{1/2})_i(HOR^8_2SiO_{1/2})_j$, where each $R^8$ is an independently selected monovalent hydrocarbon group free of aliphatic unsaturation subscript j is 1 or 2, subscript i is 0 or 1, a quantity (j+i)=2, subscript h≥1, and a quantity (h+i+j) is at least 3, alternatively 3 to 250, and alternatively 3 to 100. Alternatively, subscript h may be 1 to 250, alternatively 1 to 100. Alternatively, i may be 0 and j may be 2. Monovalent hydrocarbon groups for $R^8$ include alkyl groups, aryl groups, and aralkyl groups; alternatively alkyl groups and aryl groups. Suitable alkyl groups include methyl, ethyl, and propyl; alternatively methyl. Suitable aryl groups include phenyl. Alternatively, each $R^8$ may be an alkyl group, such as methyl. Examples of starting material B2) include hydroxyl-terminated polydimethylsiloxane, hydroxyl-terminated poly(dimethyl/diphenyl)siloxane copolymers, hydroxyl-terminated poly(dimethyl/methylphenyl)siloxane copolymers. Alternatively, suitable bis-hydroxyl terminated polydimethylsiloxanes are commercially available from Dow Silicones Corporation of Midland, Michigan, USA. Exemplary hydroxyl functional polydiorganosiloxanes are commercially available, which include the silanol functional polymers in "Gelest Reactive Silicones: Forging New Polymer Links", 2016, https://www.gelest.com/wp-content/uploads/Reactive-Silicones-No-Price-2016.pdf, at pages 22 and 24-25. Starting material B2) may be used in an amount of 80% to 95%, alternatively 85% to 95% based on combined weights of starting materials A) and B); alternatively 87% to 94%, and alternatively 89% to 94%, on the same basis.

In the method for making the product comprising the poly(meth)acrylate grafted polyorganosiloxane, starting material C) is a phosphazene condensation reaction catalyst such as a phosphonitrile halide. Without wishing to be bound by theory, it is thought that cyclic siloxane by-products (such as octamethylcyclotetrasiloxane) formation may be minimized when the phosphazene condensation reaction catalyst is used in the method.

Phosphazene condensation reaction catalysts are exemplified by those disclosed in U.S. Pat. No. 9,051,428. Exemplary phosphazene condensation reaction catalysts may contain, per molecule at least one —(N=P<)- unit and may be an oligomer having up to 10 such phosphazene units, for example having an average of 1.5 to 5 phosphazene units. The phosphazene condensation reaction catalyst can for example be a halophosphazene, such as a chlorophosphazene (phosphonitrile chloride), an oxygen-containing halophosphazene, or an ionic derivative of a phosphazene such as a phosphazenium salt, such as an ionic derivative of a phosphonitrile halide, e.g., a perchlorooligophosphazenium salt.

One suitable type of phosphazene condensation reaction catalyst is an oxygen-containing halophosphazene, such as an oxygen-containing chlorophosphazene. Such an oxygen-containing chlorophosphazene can for example have the formula C-1):

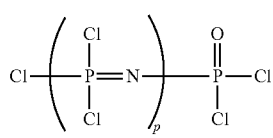

or C-2):

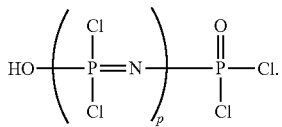

In formula C-1) and C-2), subscript p can have an average value of 1 to 10, alternatively 1 to 5. The catalyst may also comprise tautomers of the catalyst of the formula C-2) Another type of suitable oxygen-containing chlorophosphazene has the formula C-3):

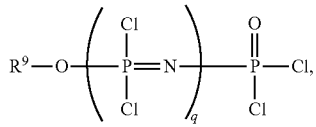

where $R^9$ represents an organosilicon moiety bonded to phosphorus via oxygen, for example a phosphazene catalyst of the formula C-4):

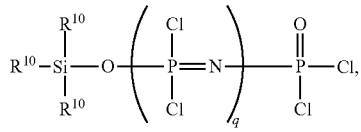

where each $R^{10}$ represents a monovalent hydrocarbon group having 1 to 18 carbon atoms or monovalent halogenated hydrocarbon group having 1 to 18 carbon atoms and subscript q has an average value of 1 to 10, alternatively 1 to 5. The catalyst may also comprise condensation products of such an organosilicon-containing phosphazene. All or some of the chlorine atoms in any of the above oxygen-containing phosphazenes can be replaced by radicals Q, in which Q represents a moiety selected from the group consisting of a hydroxyl group, a monovalent organic group, such as alkoxy or aryloxy, a halogen atom other than chlorine, an organosilicon group, and a phosphorus-containing group.

Another suitable type of phosphazene catalyst is a perchlorooligophosphazenium salt of the formula C-5):

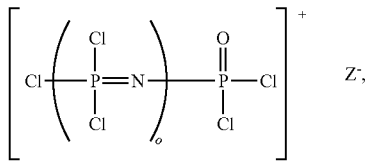

where subscript o has an average value of 1 to 10, and $Z^-$ represents an anion. Alternatively, subscript o may have an average value of 1 to 6, and alternatively, subscript o may have an average value of 2. The anion may be a complex anion and can, for example, be of the formula $MX_{(v+1)}$ in which M is an element having an electronegativity on Pauling's scale of from 1.0 to 2.0 and valency v, and X is a halogen atom. The element M can, for example, be phosphorus or antimony, alternatively phosphorus. The halogen atom for X may be Cl. The anion $Z^-$ can alternatively be a complex anion of the formula $[MX_{(v-y+1)}R^{11}_y]^-$ where each $R^{11}$ is an independently selected alkyl group having 1 to 12 carbon atoms and subscript y has a value between 0 and v, as described in U.S. Pat. No. 5,457,220. Alternatively, in formula C-5), subscript o may have an average value of 2, and the anion $Z^-$ may be $PCl_6^-$.

The phosphazene condensation reaction catalyst may be present in an amount of 1 to 200, alternatively 2 to 200 parts per million based on the combined weight of starting materials A) and B), for example at 5 to 50 parts per million.

Starting material D) is an optional polydialkylsiloxane that may be added in step 1) of the method for making the product comprising the poly(meth)acrylate grafted polyorganosiloxane. The polydialkylsiloxane may comprise unit formula D-1): $(R^{12}_2SiO_{2/2})_m(R^{12}_3SiO_{1/2})_2$, where each $R^{12}$ is an independently selected alkyl group, and subscript m is 1 to 250, alternatively 1 to 50. Suitable alkyl groups for $R^{12}$ include methyl, ethyl, and propyl; alternatively methyl. Examples of starting material D) include Di) trimethylsiloxy-terminated polydimethylsiloxane, Dii) triethylsiloxy-terminated polydiethylsiloxane, and Diii) combinations of Di) and Dii). Polydialkylsiloxanes are known in the art and are commercially available. For example, methyl silicone fluids such as trimethylsiloxy-terminated polydimethylsiloxanes are commercially available from Gelest, see for example, "Gelest: Silicone Fluids," https://www.gelest.com/themencode-pdf-viewer/?file=https://www.gelest.com:443/wp-content/uploads/Inert_Silicones.pdf, 2012, at pages 8-9 and from Dow Silicones Corporation of Midland, Michigan USA under the tradename DOWSIL™ 200 Fluids. Trimethylsiloxy-terminated polydimethylsiloxane and triethylsiloxy-terminated polydiethylsiloxane are available from Power Chemical Corporation of Jiangsu, China. The amount of starting material D) depends on various factors including the molecular weight of the polydialkylsiloxane selected, however, when used, the amount may be 1% to 10% based on weights of starting materials A) to D) used in the method.

Starting material E) is a solvent that may be used in the method described above. The solvent may be an aromatic hydrocarbon such as toluene or xylene; or ethyl acetate. The amount and type of solvent are selected so as to solubilize both polyorganosiloxane and (meth)acrylate polymer or copolymer. However, when present, the solvent may be used in an amount of 30% to 80%, alternatively 40% to 70%, based on combined weights of starting materials A), B), C), D), and E).

Starting material F) is a neutralizing agent that may optionally be used in step III) of the method for making the product comprising the poly(meth)acrylate grafted polyorganosiloxane described above. Starting material F) may be used to neutralize the product after the poly(meth)acrylate grafted polyorganosiloxane forms. If a neutralizing agent is used, any neutralizing agent suitable for the catalyst chosen can be used, see for example the neutralizing agents disclosed in U.S. Pat. No. 8,580,862. Without wishing to be bound by theory, it is thought that selection of neutralizing agent depends on pKa and solubility. Suitable neutralizing agents for phosphazene-based condensation catalysts include, but are not limited to, alkylamines such as trioctylamine, trimethylamine, triethylamine, trihexylamine, and triisononylamine. Neutralizing agents are known in the art and are commercially available, e.g., from Millipore Sigma of St. Louis, Missouri, USA. The amount of neutralizing agent depends on various factors including the amount of starting material C) the condensation catalyst, however, starting material F) may be present in an amount sufficient to provide a molar ratio of neutralizing agent to catalyst (F:C ratio) of 1:1 to 100:1, alternatively 1:1 to 30:1; and alternatively 1:1 to 20:1.

The method described above produces a poly(meth)acrylate grafted polyorganosiloxane. When starting material B-1) is used, the poly(meth)acrylate grafted polyorganosiloxane comprises unit formula: $[R^3_w(R^5-S-R'')(OR^4)_{(2-w)}Si-O_{1/2}]_p[R^3_v(R^5-S-R'')(OR^4)_{(1-v)}Si-O_{2/2}]_q$ $[(R^5-S-R'')Si-O_{3/2}]_k$ $(R^6R^7_2SiO_{1/2})_r(R^7_2SiO_{2/2})_s$ $(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a (meth)acrylate polymer or copolymer, each $R^6$ is an independently selected aliphatically unsaturated monovalent hydrocarbon group, each $R^7$ is an independently selected monovalent hydrocarbon group free of aliphatic unsaturation, subscript $p \geq 0$, subscript $q \geq 0$, subscript $k \geq 0$, a quantity $(p+q+k) \geq 1$, subscript $r \geq 0$, subscript $s \geq 0$, subscript $t \geq 0$, subscript $u \geq 0$, a quantity $(r+t) \geq 2$, and a quantity $(p+q+k+r+s+t+u)$ is sufficient to provide a molecular weight of at least 50 kDa to the poly(meth)acrylate grafted polyorganosiloxane.

Alternatively, subscript w is 1 or 2. Alternatively, subscript p is 0 to 2, alternatively 1 or 2. Alternatively, subscript q is 0 to 100. Alternatively, subscript k<5; alternatively k may be 0, 1, or 2; and alternatively k=0. Alternatively, a quantity (p+q+k) is 1 to 100. Alternatively, subscript r is 0 to 2. Alternatively, subscript s is 0 to 100. Alternatively, subscript t is 0 to 100. Alternatively, subscript u is 0 to 2. Alternatively, the quantity (p+q+r+s+t+u) is sufficient to provide a molecular weight of 50 kDa to 1,000 kDa, alternatively 60 kDa to 1,000 kDa, alternatively 50 kDa to 600 kDa, and alternatively 60 kDa to 300 kDa, to the poly(meth)acrylate grafted polyorganosiloxane.

Alternatively, in the formula for the poly(meth)acrylate grafted polyorganosiloxane above, each $R^3$ is an alkyl group of 1 to 6 carbon atoms. Alternatively, each $R^4$ is an alkyl group of 1 to 6 carbon atoms. Alternatively, each $R^5$ is an alkylene group of 2 to 8 carbon atoms. Alternatively, each $R^6$ is an alkenyl group selected from vinyl, allyl and hexenyl. Alternatively, each $R^7$ is an alkyl group of 1 to 6 carbon atoms.

The poly(meth)acrylate grafted polyorganosiloxane which has both a silicon bonded poly(meth)acrylate group and a silicon bonded aliphatically unsaturated group is useful in hydrosilylation reaction curable compositions. Without wishing to be bound by theory, it is thought that some or all of the silicon bonded aliphatically unsaturated group of the poly(meth)acrylate grafted polyorganosiloxane can react with silicon bonded hydrogen atoms. A hydrosilylation reaction curable composition comprises:

I) the poly(meth)acrylate grafted polyorganosiloxane having both a silicon bonded poly(meth)acrylate group and a silicon bonded aliphatically unsaturated group (as described above), II) an organohydrogensilicon crosslinker having, per molecule, at least 3 silicon bonded hydrogen atoms, and III) a hydrosilylation reaction catalyst. The hydrosilylation reaction curable composition may optionally further comprise one or more additional ingredients, such as IV) a hydrosilylation reaction catalyst inhibitor, V) a polyorganosilicate resin, VI) a spacer; VII) an extender, a plasticizer, or a combination thereof; VIII) a filler; IX) a filler treating agent; X) a biocide; XI) a flame retardant; XII) a surface modifier; XIII) a chain lengthener; XIV) an endblocker; XV) a flux agent; XVI) an anti-aging additive; XVII) a pigment; XVIII) an acid acceptor; XIX) a rheological additive; XX) a vehicle (e.g., a solvent or diluent); XXI) a surfactant; XXII) a corrosion inhibitor, and a combination thereof. Suitable organohydrogensilicon crosslinkers, hydrosilylation reaction catalysts, and additional starting materials are known in the art, for example, see U.S. Patent Application 2014/0228570, paragraphs [0096] to [0173] of which are hereby incorporated by reference.

In the hydrosilylation reaction composition, starting material II) is an organohydrogensilicon crosslinker, i.e., a compound having an average, per molecule, of 3 or more silicon bonded hydrogen atoms. Starting material II) may comprise a silane and/or a polyorganohydrogensiloxane compound. The amount of starting material II) in the composition depends on various factors including the SiH content of starting material II), the unsaturated group content of I) the poly(meth)acrylate grafted polyorganosiloxane, and the properties of the reaction product of the composition desired, however, the amount of starting material II) may be sufficient to provide a molar ratio of SiH groups in starting material II) to aliphatically unsaturated groups in starting material I) (commonly referred to as the SiH:Vi ratio) ranging from 0.3:1 to 40:1, alternatively 0.1:1 to 35:1, and alternatively 0.1:10 to 10:1. Starting material II) can have a linear, branched, cyclic, or resinous structure. When starting material II) is polymeric, then starting material II) can be a homopolymer or a copolymer. The silicon-bonded hydrogen atoms in starting material II) can be located at terminal, pendant, or at both terminal and pendant positions. Starting material II) may be one SiH functional compound. Alternatively, starting material II) may comprise a combination of two or more SiH functional compounds. Starting material II) may be two or more organohydrogenpolysiloxanes that differ in at least one of the following properties: structure, average molecular weight, viscosity, siloxane units, and sequence.

The organohydrogensilicon compound of starting material II) may comprise a polyorganohydrogensiloxane comprising siloxane units including, but not limited to, $HR^{13}_2SiO_{1/2}$, $R^{13}_3SiO_{1/2}$, $HR^{13}SiO_{2/2}$, $R^{13}_2SiO_{2/2}$, $R^{13}SiO_{3/2}$, $HSiO_{3/2}$ and $SiO_{4/2}$ units. In the preceding formulae, each $R^{13}$ is an independently selected monovalent hydrocarbon groups. Suitable monovalent hydrocarbon groups for $R^{13}$ include groups free of aliphatic unsaturation described above for $R^7$.

Starting material II) may comprise a polyorganohydrogensiloxane of

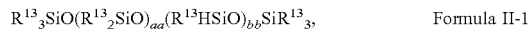

Formula II-1

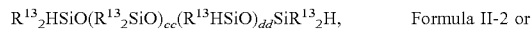

Formula II-2 or a combination thereof.

In formulae II-1) and II-2) above, subscript aa has an average value ranging from 0 to 2000, subscript bb has an average value ranging from 2 to 2000, subscript cc has an average value ranging from 0 to 2000, and subscript dd has an average value ranging from 0 to 2000. Each $R^{13}$ is independently a monovalent hydrocarbon group, such as a monovalent hydrocarbon group free of aliphatic unsaturation, such as that described above for $R^7$. $R^{13}$ may have 1 to 18 carbon atoms. $R^{13}$ may be alkyl or aryl. Suitable alkyl groups include methyl and ethyl, alternatively methyl. Suitable aryl groups include phenyl.

Polyorganohydrogensiloxanes for starting material II) are exemplified by:
a) dimethylhydrogensiloxy-terminated polydimethylsiloxane,
b) dimethylhydrogensiloxy-terminated poly(dimethylsiloxane/methylhydrogensiloxane),
c) dimethylhydrogensiloxy-terminated polymethylhydrogensiloxane,
d) trimethylsiloxy-terminated poly(dimethylsiloxane/methylhydrogensiloxane),
e) trimethylsiloxy-terminated polymethylhydrogensiloxane,
f) a resin consisting essentially of $H(CH_3)_2SiO_{1/2}$ units and $SiO_{4/2}$ units, and
g) a combination thereof.

Methods of making linear, branched, and cyclic organohydrogenpolysiloxanes suitable for use as starting material II), such as hydrolysis and condensation of organohalosilanes, are well known in the art. Methods of making organohydrogenpolysiloxane resins suitable for use as starting material II) are also well known as exemplified in U.S. Pat. Nos. 5,310,843; 4,370,358; and 4,707,531.

Such organohydrogensilicon compounds are commercially available and include, SYL-OFF™ SL2 CROSSLINKER and SYL-OFF™ SL12 CROSSLINKER, both of which are commercially available from Dow Silicones Corporation of Midland, Michigan, U.S.A.

The exact amount of starting material II) in the composition depends on various factors including reactivity of I) the poly(meth)acrylate grafted polyorganosiloxane, the type and amount of starting material II), and the type and amount of any additional starting material (other than starting material II)), if present. However, the amount of starting material II) in the composition may range from >0% to 25%, alternatively 0.1% to 15%, and alternatively 1% to 5%, based on total weight of all starting materials in the composition.

Hydrosilylation reaction catalysts for starting material III) are known in the art and are commercially available. Hydrosilylation reaction catalysts include platinum group metal catalysts. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or core-shell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of making them are known in the art, as exemplified in U.S. Pat. Nos. 4,766,176 and 5,017,654.

The amount of catalyst used herein will depend on various factors including the selection of starting materials A) and B) and their respective contents of silicon bonded hydrogen atoms and aliphatically unsaturated groups, and whether an inhibitor is present, however, the amount of catalyst is sufficient to catalyze hydrosilylation reaction of SiH and aliphatically unsaturated groups, alternatively the amount of catalyst is sufficient to provide 1 ppm to 1000 ppm of the platinum group metal based on combined weights of all starting materials, alternatively 5 ppm to 100 ppm, on the same basis.

Inhibitors for hydrosilylation reaction curable compositions for starting material IV are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine; fumarates such as dialkyl fumarates, dialkenyl fumarates, dialkoxyalkyl fumarates; maleates such as diallyl maleate; nitriles; ethers; carbon monoxide; alkenes such as cyclo-octadiene, divinyltetramethyldisiloxane; alcohols such as benzyl alcohol; and a combination thereof.

Alternatively, the inhibitor may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol stabilizer, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, ingredient (IV) is exemplified by methyl(tris(1,1-dimethyl-2-propynyloxy))silane, ((1,1-dimethyl-2-propynyl)oxy)trimethylsilane, or a combination thereof. The silylated acetylenic compound may be prepared by methods known in the art, such as silylating an acetylenic alcohol described above by reacting it with a chlorosilane in the presence of an acid receptor.

The amount of inhibitor added to the hydrosilylation reaction curable composition will depend on various factors including the desired pot life of the composition, whether the composition will be a one part composition or a multiple part composition, the particular inhibitor used. However, when present, the amount of inhibitor may range from 0% to 1%, alternatively 0% to 5%, alternatively 0.001% to 1%, alternatively 0.01% to 0.5%, and alternatively 0.0025% to 0.025%, based on the weight of all starting materials in the hydrosilylation reaction curable composition.

The hydrosilylation reaction curable composition may optionally further comprise starting material V) a polyorganosilicate resin. The polyorganosilicate resin is an MQ resin consisting essentially of $R^{14}_3SiO_{1/2}$ units and $SiO_{4/2}$ units, where each $R^{14}$ is independently selected from the group consisting of a hydroxyl group and a monovalent hydrocarbon group. The monovalent hydrocarbon group for $R^{14}$ may be selected from the group consisting of an alkyl group of 1 to 18 carbon atoms, and an alkenyl group of 2 to 18 carbon atoms, and an aryl group or aralkyl group of 6 to 18 carbon atoms. Suitable alkyl groups, alkenyl groups, aryl groups, and aralkyl groups are as defined below. Alternatively each $R^{14}$ may be a hydroxyl group or an alkyl group, such as methyl.

Alternatively, the polyorganosilicate resin may comprise unit formula (II): $(R^{15}_2R^{16}SiO_{1/2})_x(R^{15}_3SiO_{1/2})_y(SiO_{4/2})_z$, where $R^{15}$ is an alkyl group, an aryl group, or an aralkyl group, and $R^{16}$ is an alkenyl group of 2 to 18 carbon atoms, such as vinyl, allyl or hexenyl, subscript x≥0, subscript y≥0, subscript z>0, a quantity (x+y)>0, and subscripts x, y, and z have values such that $0.95 \leq (x+y)/z \leq 1.3$.

The resin may contain an average of 3 to 30 mole percent of alkenyl groups, alternatively 0.1 to 30 mole percent, alternatively 0.1 to 5 mole percent, alternatively 3 to 10 mole percent. The mole percent of alkenyl groups in the resin is the ratio of the number of moles of alkenyl group-containing siloxane units in the resin to the total number of moles of siloxane units in the resin, multiplied by 100.

The Mn of the polyorganosilicate resin is typically greater than 3,000 Da, alternatively >3,000 Da to 8,000 Da, and alternatively 4,500 to 7,500 Da. Mn may be measured by GPC in the method described below.

Methods of making resins are well known in the art. For example, resin may be prepared by treating a resin copolymer produced by the silica hydrosol capping process of Daudt, et al. with at least an alkenyl-containing endblocking reagent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The resin, which typically contains less than 2% of silicon-bonded hydroxyl groups, may be prepared by reacting the product of Daudt, et al. with an alkenyl group-containing endblocking agent and/or an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

Various suitable polyorganosilicate resins are commercially available from sources such as Dow Silicones Corporation of Midland, MI, U.S.A., Momentive Performance Materials of Albany, N.Y., U.S.A., and Bluestar Silicones USA Corp. of East Brunswick, N.J., U.S.A. For example, DOWSIL™ MQ-1600 Solid Resin, DOWSIL™ MQ-1601 Solid Resin, and DOWSIL™ 1250 Surfactant, DOWSIL™ 7466 Resin, and DOWSIL™ 7366 Resin, all of which are commercially available from Dow Silicones Corporation of Midland, Michigan, USA, are suitable for use herein. Such resins may be supplied in organic solvent.

EXAMPLES

These examples are intended to illustrate the invention and should not be interpreted as limiting the scope set forth in the claims. Starting Materials used in the Examples are shown below in Table 2.

TABLE 2

| Starting Materials | | | |
|---|---|---|---|
| Abbreviation | Description | Function | Source |
| BMA | butyl methacrylate | i) (meth)acrylate monomer | The Dow Chemical Company |
| MMA | methyl methacrylate | i) (meth)acrylate monomer | The Dow Chemical Company |
| 2-EHA | 2-ethylhexyl acrylate | i) (meth)acrylate monomer | The Dow Chemical Company |
| AA | Acrylic acid | i) (meth)acrylate monomer | The Dow Chemical Company |
| BA | Butyl acrylate | i) (meth)acrylate monomer | The Dow Chemical Company |
| HSPrMeSi(OMe)$_2$ | (3-mercaptopropyl)methyl, dimethoxysilane | ii) alkoxysilane | Millipore Sigma |
| HSPrMe$_2$SiOMe | (3-mercaptopropyl)dimethyl, methoxysilane | ii) alkoxysilane | Synthesized in Reference Example I, below |
| tAPPiv | tert-amyl peroxypivalate 75% solution in mineral spirits | iii) free radical initiator | Akzo Nobel, Trigonox 125-C75 |

TABLE 2-continued

Starting Materials

| Abbreviation | Description | Function | Source |
|---|---|---|---|
| tBPPiv | tert-butyl peroxypivalate 75% solution in mineral spirits | iii) free radical initiator | Akzo Nobel, Trigonox 25-C75 |
| EtOAc | ethyl acetate | iv) solvent | Fisher Scientific |
| OH terminated PDMS 1 | bis hydroxy terminated polydimethylsiloxane with DP = 32 | B2) hydroxyl functional polydiorganosiloxane | Dow Silicones Corporation |
| Vi-terminated PDMS 1 | bis vinyl terminated polydimethylsiloxane with DP = 48 | B1) unsaturated polydiorganosiloxane | Dow Silicones Corporation |
| Phosphazene Catalyst 1 | 1% of 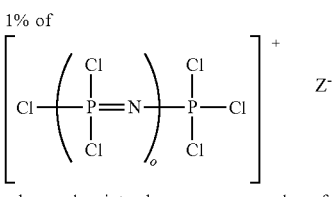 where subscript o has an average value of 2 and Z⁻ is $PCl_6^-$ in 99% of dichloromethane | C) condensation reaction catalyst | Dow Silicones Corporation |
| 4-7042 | a mixture of hydroxy-terminated, poly(dimethyl, methylvinyl siloxane) and alpha-hydroxy-terminated, omega-methoxy-terminated, poly(dimethyl, methylvinyl siloxane) | B1) where B has both Vi and OH | DOWSIL™ 4-7042 is commercially available from Dow Silicones Corporation |
| $MD_{22}M$ | trimethyl-siloxy terminated polydimethylsiloxane with DP = 22 | D) polydialkylsiloxane | Dow Silicones Corporation |
| Neutralizer | trioctylamine | F) neutralizing agent | Millipore Sigma |
| toluene | toluene | solvent | Fisher Scientific |
| heptanes | heptanes | solvent | Fisher Scientific |
| THF | tetrahydrofuran | solvent | Fisher Scientific |
| SiH crosslinker | poly(dimethyl/methylhydrogen) siloxane copolymer | II) organohydrogensilicon crosslinker | Dow Silicones Corporation |
| SiH crosslinker 2 | trimethylsiloxy-terminated poly(dimethyl/methylhydrogen)siloxane copolymer | II) organohydrogensilicon crosslinker | DOWSIL 6-3570 from Dow Silicones Corporation |
| | Karstedt's Catalyst | III) hydrosilylation reaction catalyst | Dow Silicones Corporation |
| ETCH | ethynyl cyclohexanol | IV) hydrosilylation reaction inhibitor | Millipore Sigma |
| Resin 1 | a polyorganosilicate resin having $(Me_3SiO_{1/2})$ and $(SiO_{4/2})$ units, where Me represents a methyl group, with a molecular weight of 3800 Da to 4500 Da | V) polyorganosilicate resin | Dow Silicones Corporation |
| Resin 2 | A solution of 74.7% of a polyorganosilicate resin having $(Me_3SiO_{1/2})$ and $(SiO_{4/2})$ units, where Me represents a methyl group, with a molecular weight of 2900 Da by GPC; dissolved in balance of solvent | V) polyorganosilicate resin | Dow Silicones Corporation |

In this Reference Example A is provided a description of the process used to produce Macromonomer Example 1 (37 BMA/63 MMA, nomenclature refers to weight percent and BMA=butyl methacrylate and MMA=methyl methacrylate) with 1.9 weight percent (3-mercaptopropyl)methyldimethoxysilane based-on-monomer. The process was used to prepare the other alkoxysilyl-functional (meth)acrylate macromonomers in Examples MM-2 to MM-5 by varying appropriate starting materials and their amounts, as shown below in Table 3. Ethyl acetate (EtOAc) was dried over molecular sieves and other ingredients were used as supplied. A monomer mixture containing EtOAc (75 g), MMA (233 g), BMA (136.9 g) and (3-mercaptopropyl)methyldimethoxysilane (7 g) was prepared. EtOAc (100 g) and 12.5% of the monomer mixture (56.5 g) were added to a 4-neck 1-liter glass reactor equipped with a condenser and overhead mixer. The mixture was heated to 77° C. and sparged with nitrogen for 30 minutes. Trigonox 125-C75 (tAPPiv, 1 g) in EtOAc (10 g) was added to the reactor and held for 5 minutes. The temperature was slowly ramped to 85° C. and then the monomer mixture was fed at 0.1 mL/min for 180 min and an initiator solution (20 g of EtOAc; 2 g of Trigonox 125-C75) was fed over 240 min (180 min plus 60 min overfeed after monomer feed ends). The reaction was held at 85° C. for 180 min following the end of the initiator feed, and then the resulting mixture was allowed to cool to room temperature. The resulting mixture was precipitated in a large excess of hexanes three times and dried in a vacuum oven after each precipitation step. The final vacuum drying was done for at least 24 hrs and heated to 80-100° C. to drive off residual monomer and solvent. Example 4 deviated from this purification scheme because the BMA oligomers were soluble in hexanes so it was dried using a rotary evaporator. Tables 3 summarizes the composition and characteristics of alkoxysilyl-functional (meth)acrylate macromonomers prepared using this method for each example.

In this Reference Example B is provided as a description of the process used to produce Macromonomer Example MM-6 (100 BMA) with 0.2 weight percent (3-mercaptopropyl)methyldimethoxysilane based-on-monomer. The process was used to prepare another alkoxysilyl-functional (meth)acrylate macromonomers (Example MM-7) by varying appropriate starting materials and their amounts, as shown below in Table 3. A monomer mixture of solvent (5 g), BMA (400 g) and (3-mercaptopropyl)methyldimethoxysilane (0.7 g) was prepared. Solvent (80 g) was added to a 4-neck 1 liter glass reactor equipped with a condenser and overhead mixer. The solvent was heated to 85° C. and then the monomer mixture (400.7 g) was fed over a period of 2 hours and the initiator solution was started 5 minutes later (20 g of solvent and 11 g of Trigonex 25-C75 tBPPiv) and was feed over a period of 4 hours. At 3 hours a BA (butyl acrylate, 4 g) shot was added. The reaction was held at 85° C. for 80 min following the end of the initiator feed, and then the mixture was allowed to cool to room temperature and collected. The reaction mixture was diluted with 50 g of toluene prior to collection.

In this Reference Example C is provided as a description of the process used to produce Example MM-8 (37 BMA/63 MMA) with 8.2 weight percent (3-mercaptopropyl)methyldimethoxysilane based-on-monomer. The process was used to prepare another alkoxysilyl-functional (meth)acrylate macromonomer (Example MM-9) by varying appropriate starting materials and their amounts, as shown below in Table 3. A monomer mixture of toluene (5 g), MMA (252 g), BMA (148 g) and (3-mercaptopropyl)methyldimethoxysilane (36 g) was prepared. Toluene (80 g) was added to a 4-neck 1 liter glass reactor equipped with a condenser and overhead mixer. The solvent was heated to 85° C. and then the monomer mixture (441 g) was fed over a period of 1 hour and the initiator solution (30 g of toluene and 16.5 g of Trigonex 25-C75 tBPPiv) was feed over a period of 3 hours. At 2 hours a BA (butyl acrylate, 10 g) chase was added over a period of 30 minutes. The reaction was held at 85° C. for 80 min following the end of the initiator feed, and then the mixture was allowed to cool to room temperature and collected. For X1, the reaction mixture was diluted with 160 g of toluene prior to collection, for X2 no additional dilution was required.

TABLE 3

Summary of alkoxysilyl-functional (meth)acrylate macromonomers Prepared in Reference Examples A-C

| Macro-monomer ID | % BMA | Initiator | Initiator (mole % BOM*) | CTA (moles % BOM) | $T_{g,Fox}$ (° C.) | Reference Example |
|---|---|---|---|---|---|---|
| MM-1 | 37 | tAppiv | 0.3 | 1.2 | 68 | A |
| MM-2 | 37 | tAppiv | 0.3 | 7.6 | 68 | A |
| MM-3 | 100 | tAppiv | 0.4 | 1.5 | 20 | A |
| MM-4 | 100 | tBPPiv | 0.6 | 6.8 | 20 | A |
| MM-5 | 70 | tBPPiv | 0.5 | 2.2 | 41 | A |
| MM-6 | 100 | tBPPiv | 1.0 | 0.1 | 20 | B |
| MM-7 | 100 | tBPPiv | 1.7 | 28.0 | 20 | B |
| MM-8 | 37 | tBPPiv | 2.0 | 6.6 | 68 | C |
| MM-9 | 100 | tBPPiv | 2.8 | 7.1 | 20 | C |

*BOM = based on monomers

The process used to produce Example MM-10 (90 BMA/10 AA) with 8.3 weight percent (3-mercaptopropyl)methyldimethoxysilane based-on-monomer. A monomer mixture of toluene (10 g), BMA (350 g) and (3-mercaptopropyl)methyldimethoxysilane (0.7 g) was prepared. Solvent (80 g) was added to a 4-neck 1 liter glass reactor equipped with a condenser and overhead mixer. The solvent was heated to 85° C. Once at temperature, as initial charge of BMA (10 g), AA (10 g) and (3-mercaptopropyl)methyldimethoxysilane (1.8 g) then the monomer mixture (384.2 g) was added to the reactor. After 5 minutes, the monomer mixture was fed over a period of 2 hours and the initiator solution (20 g of solvent and 11 g of Trigonex 25-C75 tBPPiv) and was fed over a period of 4 hours. The reaction was held at 85° C. for 80 min following the end of the initiator feed, and then the mixture was allowed to cool to room temperature and collected. The reaction mixture was diluted with 100 g of toluene prior to collection.

The process used to produce Example MM-11 (100 EHA) with 10.1 weight percent (3-mercaptopropyl)methyldimethoxysilane based-on-monomer. A monomer mixture of toluene (5 g), EHA (350) and (3-mercaptopropyl)methyldimethoxysilane (34.2 g) was prepared. Solvent (80 g) was added to a 4-neck 1 liter glass reactor equipped with a condenser and overhead mixer. The solvent was heated to 85° C. Once at temperature, as initial charge of EHA (20 g) and (3-mercaptopropyl)methyldimethoxysilane (1.8 g) then the monomer mixture (384.2 g) was added to the reactor. After 5 minutes, the monomer mixture was fed over a period of 2 hours and the initiator solution (20 g of solvent and 11 g of Trigonex 25-C75 tBPPiv) and was fed over a period of 4 hours. The reaction was held at 85° C. for 80 min following the end of the initiator feed, and then the mixture was allowed to cool to room temperature and collected.

The process used to produce Example MM-12 (90 EHA/10 AA) with 8.3 weight percent (3-mercaptopropyl)methyldimethoxysilane based-on-monomer. A monomer mixture of EHA (360 g), AA (40 g) and (3-mercaptopropyl)methyldimethoxysilane (36 g) was prepared. Solvent (80 g) was added to a 4-neck 1 liter glass reactor equipped with a condenser and overhead mixer. The solvent was heated to 85° C. Once at temperature, the monomer mixture was fed over a period of 2 hours and the initiator solution (20 g of solvent and 11 g of Trigonex 25-C75 tBPPiv) and was fed over a period of 4 hours. The reaction was held at 85° C. for 80 min following the end of the initiator feed, and then the mixture was allowed to cool to room temperature and collected.

TABLE 4

Summary of alkoxysilyl-functional (meth)acrylate macromonomers Examples MM-10 through

| Macro-monomer ID | Monomer Composition (wt %) | Initiator | solvent | Initiator (mole % BOM*) | CTA (moles % BOM) | $T_{g,Fox}$ (° C.) |
|---|---|---|---|---|---|---|
| MM-10 | 90% BMA/ 10% AA | tBPPiv | toluene | 1.5 | 6.5 | 26 |
| MM-11 | 100% EHA | tBPPiv | toluene | 2.2 | 9.2 | −52 |
| MM-12 | 90% EHA/ 10% AA | tBPPiv | toluene | 1.7 | 28 | −43 |

TABLE 5

Summary of synthesized PDMS and selected properties.

| Example | Macromonomer Mn Target (kDa) | (actual) | BMA fraction in Acrylic Oligomer % | Acrylic fraction, wt % | Si—Ac Polymer MW$^a$ (kDa) | PDI$^a$ | DSC Curing peak (° C.)$^b$ | Haze (%) | Clarity (%) |
|---|---|---|---|---|---|---|---|---|---|
| 6 | 6 | (7.9) | 70 | 6 | 161 | 1.85 | 105.7 | 5.32 | 97.5 |
| 7 | 2 | (1.9) | 37 | 2 | 167 | 1.89 | 103.2 | | |
| 8 | 2 | (1.9) | 37 | 10 | 192 | 1.93 | 109.0 | | |
| 9 | 10 | (7.7) | 37 | 2 | 166 | 1.88 | 104.0 | 1.28 | 96.5 |
| 10 | 10 | (7.7) | 37 | 10 | 239 | 1.67 | | | |
| 11 | 2 | (2.2) | 100 | 15 | 159 | 1.54 | | | |
| 12 | 2 | (2.2) | 100 | 20 | 133 | 1.66 | | | |
| 13 | 0.5 | (0.75) | 100 | 10 | 62 | 1.58 | 128.4 | | |
| 14 | 100 | (12) | 100 | 10 | 131 | 2.32 | 127.3 | 56.3 | 97.5 |
| 17 | 6 | | 100 | 5.5 | 504 | 1.39 | 127.1 | 6.1 | 99.0 |
| 18 | 2 | | 100 | 10 | 144 | 1.46 | 119.7 | 17.2 | 99.7 |
| 19 | 2 | | 90 | 10 | 577* | 5.42 | 116.0 | | |

$^a$MW and PDI determined by GPC analysis
*ultra high MW material might present but was filtered out in GPC injection In this Reference Example D, the alkoxysilyl-functional (meth)acrylate macromonomers of Examples MM-1 to MM-12 above were used to prepare poly(meth)acrylate grafted polyorganosiloxanes. The procedure was as follows: A 1-liter 4-neck round-bottom flask with a stirring rod and blade was pre-weighed and recorded prior to the start of the experiment. To this flask was added 181.0 grams OH terminated PDMS 1, 5.65 grams of Vi-terminated PDMS 1, 11.41 grams of the Example MM-5 (which had Mn=7.9 kDa and BMA=70%), and 238.5 grams of toluene were charged into the round-bottom flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 120° C. When the pot temperature reached 80° C., 0.47 mL of Phosphazene Catalyst 1 was added. As the reaction mixture continued to heat, the water, methanol, and toluene distillate was collected in a Dean Stark apparatus. Heating was discontinued after distilling enough toluene to obtain a final concentration of 60% solids solution, typically by removal of 100 g of distillate. Upon reaching the final concentration of 60% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask. Additionally, the vinyl content of the solution was calculated.

Example GP-2 to GP-20 were repeated using the procedure in Reference Example D, described above, except replacing the alkoxysilyl-functional (meth)acrylate macromonomers prepared in Example 5 with a different alkoxysilyl-functional (meth)acrylate macromonomer and changing the wt % of the alkoxysilyl-functional (meth)acrylate macromonomers. These examples are listed in Table 6.

TABLE 6

Summary of synthesized PDMS and selected properties.

| Grafted Polysiloxane ID | Macromonomer ID | Acrylic fraction (wt. %) | Si—Ac Polymer Mw$^a$ (kDa) | PDI$^a$ | DSC Curing peak (° C.) | Haze (%) | Clarity (%) |
|---|---|---|---|---|---|---|---|
| GP-1 | MM-5 | 6 | 161 | 1.85 | 105.7 | 5.32 | 97.5 |
| GP-2 | MM-2 | 2 | 167 | 1.89 | 103.2 | | |
| GP-3 | MM-2 | 10 | 192 | 1.93 | 109.0 | | |
| GP-4 | MM-1 | 2 | 166 | 1.88 | 104.0 | 1.28 | 96.5 |
| GP-5 | MM-1 | 10 | 239 | 1.67 | | | |
| GP-6 | MM-4 | 15 | 159 | 1.54 | | | |
| GP-7 | MM-4 | 20 | 133 | 1.66 | | | |
| GP-8 | MM-7 | 10 | 62 | 1.58 | 128.4 | | |
| GP-9 | MM-6 | 10 | 131 | 2.32 | 127.3 | 56.3 | 97.5 |
| GP-10 | MM-4 | 10 | 144 | 1.46 | 119.7 | 17.2 | 99.7 |
| GP-11 | MM-4 | 2 | 169 | 1.94 | | | |
| GP-12 | MM-4 | 10 | 162 | 1.86 | | | |
| GP-13 | MM-3 | 2 | 146 | 1.74 | | | |
| GP-14 | MM-3 | 10 | 202 | 1.77 | | | |
| GP-15 | MM-3 | 20 | 77 | 3.07 | | | |
| GP-16 | MM-8 | 2 | 191 | 1.90 | | | |
| GP-17 | MM-9 | 2 | 204 | 1.76 | | | |
| GP-18 | MM-8 | 10 | 208 | 2.00 | | | |
| GP-19 | MM-9 | 10 | 197 | 1.95 | | | |
| GP-20 | MM-1 | 10 | ND$^b$ | ND | | | |

TABLE 6-continued

Summary of synthesized PDMS and selected properties.

| Grafted Polysiloxane ID | Macromonomer ID | Acrylic fraction (wt. %) | Si—Ac Polymer Mw$^a$ (kDa) | PDI$^a$ | DSC Curing peak (° C.) | Haze (%) | Clarity (%) |
|---|---|---|---|---|---|---|---|
| GP-21 | MM-10 | 10 | 300 | 2.45 | | | |
| GP-22 | MM-11 | 10 | 238 | 1.96 | | | |
| GP-23 | MM-12 | 10 | 231 | 2.66 | | | |

$^a$MW and PDI determined by GPC analysis,
$^b$ND = Not determined
*ultra high MW material might be present but was filtered out in GPC injection In addition to the above polyacrylate grafted PDMS examples, several more examples with various structural variations are shown below.

Example GP-24—Synthesis of a poly(dimethyl,methylvinyl)siloxane copolymer with polyacrylate ends A monomer mixture of butylmethacrylate (200 g) and HSPrMe$_2$SiOMe (5 g) were added to a jar. An initiator solution was made of tBPPiv (5.5 g) and toluene (10 g). A four neck round bottom flask was charged with 40 grams of toluene. The toluene was heated to 85° C., at which point the monomer and initiator mixtures were fed in over 2 and 4 hours, respectively. Butyl acrylate (2 g) was added to the flask 3 hours after the monomer mixture feed started. After the initiator feed ended, the reaction was maintained at 85° C. for 80 minutes. This produced an alkoxysilyl-functional (meth)acrylate macromonomer with 6.6 kDa 1 OOBMA.

Figure 4:
FIG. 4 shows Scheme 4, in which a poly(dimethyl/methylvinyl)siloxane copolymer with polyacrylate endblocks is synthesized in Example 17.

A 1 L 4-neck round bottom flask with a stirring rod and blade was weighed before the experiment (571.50 g). In a typical synthesis shown in Scheme 4 in FIG. 4, 181.0 g of OH terminated PDMS 1, 2.46 g of 4-7042, 10.098 g of the above produced alkoxysilyl-functional (meth)acrylate macromonomer with 100 BMA, and 238 g of toluene were charged into the flask, which was equipped with a thermal couple and a Dean Stark apparatus with a water-cooled condenser adapted to nitrogen bubbler. The pot temperature was heated to 80-100° C. under nitrogen blanket, and 0.47 mL of Phosphazene Catalyst 1 was added. Then water, methanol, and toluene were collected in the Dean Stark apparatus when the pot temperature was raised to 103° C. Heating was stopped after distilling off a total of 67.0 g of distillates with pot temperature raised to 113° C. The reaction ran for 1 hour and 14 minutes from the time the catalyst was added at 80° C. until the quenching of the reaction. The reaction was stopped after only 67.0 grams of distillate due to viscosity of the polymer. Next 0.2 mL of trioctylamine (neutralizer) was added to the flask under stirring and the resulting mixture was allowed to cool to room temperature. After the pot temperature was cooled down to room temperature, the flask with stirring rod and blade was weighed again (930.0 g). The Non-volatile content (NVC) calculated based on the mass balance was 54.0% assuming that all of the polymers contents remained in the flask. The vinyl content of the resulting poly(meth)acrylate grafted polyorganosiloxane was 0.069%.

Example GP-25—Polyacrylate Grafted Pendant Vinyl PDMS with Methyl Ends

Figure 5:
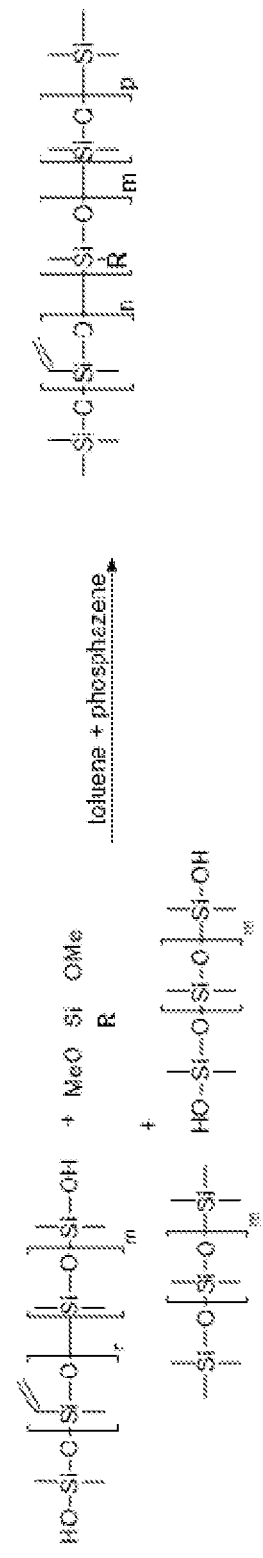
FIG. 5 shows Scheme 5, in which a poly(dimethyl/methyl,vinyl/methyl,polyacrylate)siloxane copolymer with trimethylsiloxy endblocks is synthesized in Example 18.

A 1 L 4-neck round bottom flask with a stirring rod and blade was weighed before the experiment (571.49 g). In a typical synthesis shown in Scheme 5 in FIG. 5, 181.0 g of OH terminated PDMS 1, 2.46 g of 4-7042, 2.70 g of MD$_{22}$M, 18.62 g of the alkoxysilyl-functional (meth)acrylate macromonomer prepared in Example 4, and 238 g of toluene were charged into the flask, which was also equipped with a thermal couple and a Dean Stark apparatus with a water-cooled condenser adapted to nitrogen bubbler. The pot temperature was heated to 80-100° C. under nitrogen blanket and 0.47 mL Phosphazene Catalyst 1 was added. Then water, methanol, and toluene were collected in the Dean Stark apparatus when the pot temperature was raised to 103° C. Heating was stopped after distilling off a total of 96.8 g of distillates with pot temperature raised to 113° C. The reaction ran for 1 hour and 20 minutes from the time the catalyst was added at 80° C. until the quenching of the reaction. Next 0.2 mL of trioctylamine (neutralizer) was added to the flask under stirring and the mixture was allowed to cool to room temperature. After the pot temperature was cooled down to room temperature, the flask with stirring rod and blade was weighed again (929.3 g). The Non-volatile content (NVC) calculated based on the mass balance was 57.2% assuming that all of the polymer contents remained in the flask. The sample was collected in a wide mouth bottle. The vinyl content of the resulting poly(meth)acrylate grafted polyorganosiloxane was 0.069%.

Example GP—26

In this Example GP-26, a bis-hydroxyl-terminated polydimethylsiloxane having pendant polybutylmethacrylate groups was synthesized as follows. A 1-liter 4-neck round-bottom flask with a stirring rod and blade was pre-weighed and recorded prior to the start of the experiment. To this flask was added 181.3 grams OH terminated PDMS 1, 18.17 grams of the macromonomer of Example MM-3 (which had Mn=8,000 g/mol and BMA=100%), and 239.61 grams of toluene were charged into the round-bottom flask equipped with an overhead mechanical stirrer, thermocouple, and a Dean Stark apparatus with a water-cooled condenser attached to a nitrogen bubbler. When the pot temperature reached 80-100° C. under nitrogen blanket, 0.47 mL of Phosphazene Catalyst 1 was added. As the reaction mixture continued to heat, the water, methanol, and toluene distillate was collected in a Dean Stark apparatus. Heating was discontinued after distilling enough toluene to obtain a final concentration of 50% solids solution. Upon reaching the final concentration of 50% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask.

Reference Example E—GPC Experimental Details

The molecular weight data was determined by analysis on a Waters 2695 model GPC. The poly(meth)acrylate grafted polyorganosiloxanes were dissolved in THF at a concentration of 5 mg solids/mL, and filtered through 0.45 μm PTFE syringe filters prior to injection of a 100 μL aliquot of the sample. The GPC was equipped with two Polymer Laboratories PLgel 5 μm Mixed-C columns (300 mm×7.5 mm), preceded by a PLgel 5 μm guard column (50 mm×7.5 mm) at a flow rate of 1.0 mL/min at 35° C. Detection was performed using a Waters 2410 differential refractive index detector. A conventional calibration of 16 narrow polystyrene standards covering the range of 580 g/mole to 2,300,000 g/mole and fit to a third order polynomial curve.

Reference Example—DSC $T_g$: TA Instruments Q1000 DSC was used for both glass transition temperature ($T_g$) and curing study. The sample was weighed out in a hermetic DSC pan (5-15 mg each), recording the pan weight first then sample weight. It was then placed in a vacuum oven at 90° C. for 8 hours. Once removed from the oven the sample was again weighed to obtain actual sample weight and then placed on the TA Instruments Q1000 DSC. For $T_g$ measurements, the sample went through 2 cycles from –90 to 150° C. at 10° C./min, and the $T_g$ was determined from the $2^{nd}$ heating ramp.

Reference Example F—General Procedure for Making and Curing Hydrosilylation Reaction Curable Compositions Samples prepared in Examples GP-1 through GP-4 and GP-8 through GP-10 were mixed with SiH Crosslinker, Resin 1, Karstedt's catalyst, and ETCH based on a typical weight ratio of 44.1:2.7:53.2:0.4:0.05, and then 10 mg of the mixture was placed in a hermetic DSC pan and sealed. The sample weight was recorded. The DSC run from RT to 200° C. at 10° C./min. An exothermal peak between 10° and 120° C. was typically observed for the hydrosilylation of the vinyl groups with silanes.

For the Benchmark, a vinyl terminated vinyl siloxane was prepared using 1-liter 4-neck round-bottom flask with a stirring rod and blade was pre-weighed and recorded prior to the start of the experiment. 169.4 grams OH terminated PDMS 1, 5.56 grams of Vi-terminated PDMS 1, and 219.5 grams of toluene were charged into the flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 120° C. When the pot temperature reached 84° C., 0.47 mL of Phosphazene Catalyst 1 was added. As the reaction mixture continued to heat, the water, methanol, and toluene distillate was collected in a Dean Stark apparatus. Heating was discontinued after distilling 96.1 g of azeotrope. Then 0.20 mL of trioctylamine was added to the reaction flask under stirring to neutralize the reaction mixture and the resulting mixture was allowed to cool to room temperature. The round-bottom flask with stirring rod and blade was weighed and recorded. The NVC was then calculated to be 59% based on the mass balance (difference between pre-weight and final weight) assuming that all of the polymers content remained in the flask. The MW of the resulting polymer was 153 kDa and the PDI was 1.98. The PSA was prepared according to the method outlined in Reference Example F.

Reference Example G—Film Sample Preparation

Create films: a sheet of paper was placed on a vacuum plate with vacuum on, then a sheet of release liner was placed on over the paper. The desired composition prepared as described above for Reference Example F was poured onto the release liner and a 4 mil bird bar was used to make a film. The film was placed in a Despatch™ oven at 150° C. for 5 minutes. After the sample was cooled a 2 inch×8½ strip was cut and transferred onto a glass substrate by using a ~5 pound roller.

Reference Example H—Haze and Clarity

Optical properties (haze and clarity) were measured of a film sample prepared according to Reference Example F on a glass substrate with a haze-gard plus instrument from BYK Gardner.

Reference Example I—NMR $^{29}$Si NMR spectra were acquired on an Agilent 500 MHz DD2 (mi-MR-06) system equipped with a 16 mm silicon free AutoX probe. The samples were prepared with CDCl$_3$+ 0.02M Cr(acac)$_3$ in a Si-free Teflon NMR tube. Standard parameters were applied except nt=1024. $^1$H NMR spectra were acquired on a Bruker Avance III HD NMR spectrometer equipped with a 5 mm TCI H C/Si cryoprobe (mi-MR-07). The samples were prepared with CDCl$_3$ in a 5 mm NMR tube. Standard parameters were applied.

Reference Example J—Synthesis of HSPrMe2SiOMe

A 3 M solution of CH$_3$MgBr in diethyl ether (50 mL, 0.15 mol) was added dropwise to a solution of 3-mercaptopropyltrimethoxysilane (8.5 g, 0.043 mol) in 50 mL of THF, while the temperature was kept between 0 and 10° C. The reaction mixture was stirred for 1 h at 0° C. and then treated dropwise with CH$_3$OH (40 mL). The solid was filtered. The crude material was used directly into the next reaction. 5.4 g was collected to give a 75% yield of pure product. NMR is consistent with the literature reference, Agina, E.V., ACS Applied Materials & Interfaces, 2015, 22, 11755-11764.

In this Reference Example D, the alkoxysilyl-functional (meth)acrylate macromonomers of Examples MM-1 to MM-12 above were used to prepare poly(meth)acrylate grafted polyorganosiloxanes. The procedure was as follows: A 1-liter 4-neck round-bottom flask with a stirring rod and blade was pre-weighed and recorded prior to the start of the experiment. To this flask was added 181.0 grams OH terminated PDMS 1, 5.65 grams of Vi-terminated PDMS 1, 11.41 grams of the Example MM-5 (which had Mn=7.9 kDa and BMA=70%), and 238.5 grams of toluene were charged into the round-bottom flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 120° C. When the pot temperature reached 80° C., 0.47 mL of Phosphazene Catalyst 1 was added. As the reaction mixture continued to heat, the water, methanol, and toluene distillate was collected in a Dean Stark apparatus. Heating was discontinued after distilling enough toluene to obtain a final concentration of 60% solids solution, typically by removal of 100 g of distillate. Upon reaching the final concentration of 60% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask. Additionally, the vinyl content of the solution was calculated.

Example GP-2 to GP-20 were repeated using the procedure in Reference Example D, described above, except replacing the alkoxysilyl-functional (meth)acrylate macromonomers prepared in Example 5 with a different alkoxysilyl-functional (meth)acrylate macromonomer and changing the wt % of the alkoxysilyl-functional (meth)acrylate macromonomers. These examples are listed in Table 6.

TABLE 6

Summary of synthesized PDMS and selected properties.

| Grafted Polysiloxane ID | Macromonomer ID | Acrylic fraction (wt. %) | Si—Ac Polymer Mw$^a$ (kDa) | PDI$^a$ | DSC Curing peak (° C.) | Haze (%) | Clarity (%) |
|---|---|---|---|---|---|---|---|
| GP-1 | MM-5 | 6 | 161 | 1.85 | 105.7 | 5.32 | 97.5 |
| GP-2 | MM-2 | 2 | 167 | 1.89 | 103.2 | | |
| GP-3 | MM-2 | 10 | 192 | 1.93 | 109.0 | | |
| GP-4 | MM-1 | 2 | 166 | 1.88 | 104.0 | 1.28 | 96.5 |
| GP-5 | MM-1 | 10 | 239 | 1.67 | | | |
| GP-6 | MM-4 | 15 | 159 | 1.54 | | | |
| GP-7 | MM-4 | 20 | 133 | 1.66 | | | |
| GP-8 | MM-7 | 10 | 62 | 1.58 | 128.4 | | |
| GP-9 | MM-6 | 10 | 131 | 2.32 | 127.3 | 56.3 | 97.5 |
| GP-10 | MM-4 | 10 | 144 | 1.46 | 119.7 | 17.2 | 99.7 |
| GP-11 | MM-4 | 2 | 169 | 1.94 | | | |
| GP-12 | MM-4 | 10 | 162 | 1.86 | | | |
| GP-13 | MM-3 | 2 | 146 | 1.74 | | | |
| GP-14 | MM-3 | 10 | 202 | 1.77 | | | |
| GP-15 | MM-3 | 20 | 77 | 3.07 | | | |
| GP-16 | MM-8 | 2 | 191 | 1.90 | | | |
| GP-17 | MM-9 | 2 | 204 | 1.76 | | | |
| GP-18 | MM-8 | 10 | 208 | 2.00 | | | |
| GP-19 | MM-9 | 10 | 197 | 1.95 | | | |
| GP-20 | MM-1 | 10 | ND$^b$ | ND | | | |
| GP-21 | MM-10 | 10 | 300 | 2.45 | | | |
| GP-22 | MM-11 | 10 | 238 | 1.96 | | | |
| GP-23 | MM-12 | 10 | 231 | 2.66 | | | |
| GP-24 | NA | 5.5 | 504 | 1.39 | 127.1 | 6.1 | 99.0 |

$^a$MW and PDI determined by GPC analysis,
$^b$ND = Not determined
*ultra high MW material might be present but was filtered out in GPC injection In addition to the above polyacrylate grafted PDMS examples, several more examples with various structural variations are shown below.

Example GP-24—Synthesis of a Poly(Dimethyl,Methylvinyl)Siloxane Copolymer with Polyacrylate Ends A monomer mixture of butylmethacrylate (200 g) and HSPrMe$_2$SiOMe (5 g) were added to a jar. An initiator solution was made of tBPPiv (5.5 g) and toluene (10 g). A four neck round bottom flask was charged with 40 grams of toluene. The toluene was heated to 85° C., at which point the monomer and initiator mixtures were fed in over 2 and 4 hours, respectively. Butyl acrylate (2 g) was added to the flask 3 hours after the monomer mixture feed started. After the initiator feed ended, the reaction was maintained at 85° C. for 80 minutes. This produced an alkoxysilyl-functional (meth)acrylate macromonomer with 6.6 kDa and 100BMA.

A 1 L 4-neck round bottom flask with a stirring rod and blade was weighed before the experiment (571.50 g). In a typical synthesis shown in Scheme 4 in FIG. 4, 181.0 g of OH terminated PDMS 1, 2.46 g of 4-7042, 10.098 g of the above produced alkoxysilyl-functional (meth)acrylate macromonomer with 100 BMA, and 238 g of toluene were charged into the flask, which was equipped with a thermal couple and a Dean Stark apparatus with a water-cooled condenser adapted to nitrogen bubbler. The pot temperature was heated to 80-100° C. under nitrogen blanket, and 0.47 mL of Phosphazene Catalyst 1 was added. Then water, methanol, and toluene were collected in the Dean Stark apparatus when the pot temperature was raised to 103° C. Heating was stopped after distilling off a total of 67.0 g of distillates with pot temperature raised to 113° C. The reaction ran for 1 hour and 14 minutes from the time the catalyst was added at 80° C. until the quenching of the reaction. The reaction was stopped after only 67.0 grams of distillate due to viscosity of the polymer. Next 0.2 mL of trioctylamine (neutralizer) was added to the flask under stirring and the resulting mixture was allowed to cool to room temperature. After the pot temperature was cooled down to room temperature, the flask with stirring rod and blade was weighed again (930.0 g). The Non-volatile content (NVC) calculated based on the mass balance was 54.0% assuming that all of the polymers contents remained in the flask. The vinyl content of the resulting poly(meth)acrylate grafted polyorganosiloxane was 0.069%.

Example GP-25—Polyacrylate Grafted Pendant Vinyl PDMS with Methyl Ends

A 1 L 4-neck round bottom flask with a stirring rod and blade was weighed before the experiment (571.49 g). In a typical synthesis shown in Scheme 5 in FIG. 5, 181.0 g of OH terminated PDMS 1, 2.46 g of 4-7042, 2.70 g of MD$_{22}$M, 18.62 g of the alkoxysilyl-functional (meth)acrylate macromonomer prepared in Example 4, and 238 g of toluene were charged into the flask, which was also equipped with a thermal couple and a Dean Stark apparatus with a water-cooled condenser adapted to nitrogen bubbler. The pot temperature was heated to 80-100° C. under nitrogen blanket and 0.47 mL Phosphazene Catalyst 1 was added. Then water, methanol, and toluene were collected in the Dean Stark apparatus when the pot temperature was raised to 103° C. Heating was stopped after distilling off a total of 96.8 g of distillates with pot temperature raised to 113° C. The reaction ran for 1 hour and 20 minutes from the time the catalyst was added at 80° C. until the quenching of the reaction. Next 0.2 mL of trioctylamine (neutralizer) was added to the flask under stirring and the mixture was allowed to cool to room temperature. After the pot temperature was cooled down to room temperature, the flask with stirring rod and blade was weighed again (929.3 g). The Non-volatile content (NVC) calculated based on the mass balance was 57.2% assuming that all of the polymer contents remained in the flask. The sample was collected in a wide mouth bottle. The vinyl content of the resulting poly(meth)acrylate grafted polyorganosiloxane was 0.069%.

Example GP—26

In this Example GP-26, a bis-hydroxyl-terminated polydimethylsiloxane having pendant polybutylmethacrylate groups was synthesized as follows. A 1-liter 4-neck round-bottom flask with a stirring rod and blade was pre-weighed and recorded prior to the start of the experiment. To this flask was added 181.3 grams OH terminated PDMS 1, 18.17 grams of the macromonomer of Example MM-3 (which had Mn=8,000 g/mol and BMA=100%), and 239.61 grams of toluene were charged into the round-bottom flask equipped with an overhead mechanical stirrer, thermocouple, and a Dean Stark apparatus with a water-cooled condenser attached to a nitrogen bubbler. When the pot temperature reached 80-100° C. under nitrogen blanket, 0.47 mL of Phosphazene Catalyst 1 was added. As the reaction mixture continued to heat, the water, methanol, and toluene distillate was collected in a Dean Stark apparatus. Heating was discontinued after distilling enough toluene to obtain a final concentration of 50% solids solution. Upon reaching the final concentration of 50% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask.

Figure 3:
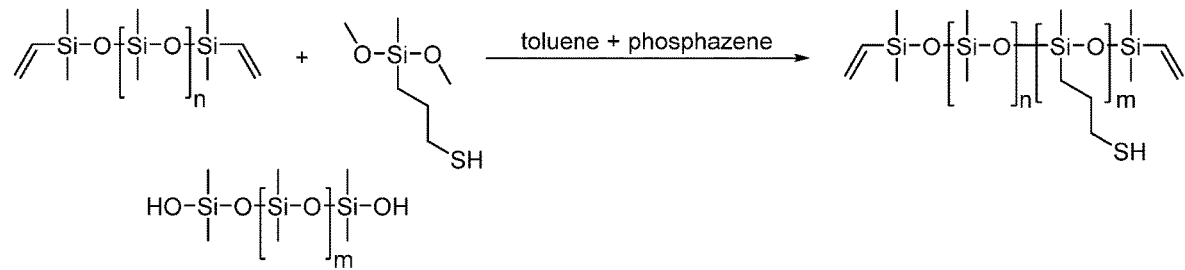
FIG. 3 shows Scheme 3 from Comparative Example 27, in which a bis-vinyl-terminated polydimethylsiloxane, a bis-silanol terminated polydimethylsiloxane, and mercaptopropylmethyldimethoxysilane are combined in the presence of phosphazene catalyst 1 and toluene, thereby making a mercapto-functionalized bis-vinyl terminated poly(dimethyl/methyl mercaptopropyl)siloxane copolymer.

Comparative Example 27—Grafting Polyacrylate Through a Mercapto Functionalized Vinyl PDMS Scheme 3: Following Scheme 3, shown below in FIG. 3, a 1 L 4-neck round bottom flask with a stirring rod and blade was weighed before the experiment (571.49 g). In a typical synthesis, 181.0 g OH terminated PDMS 1, 5.65 g of Vi-terminated PDMS 1, 0.132 mL of (3-mercaptopropyl) methyldimethoxysilane and 238 g of toluene were charged into the flask equipped with the mechanical stirrer, a thermal couple, and a Dean Stark apparatus with a water-cooled condenser adapted to a nitrogen bubbler. The pot temperature was heated to 80-100° C. under nitrogen blanket and 0.47 mL of Phosphazene Catalyst 1 was added, then water, methanol, and toluene were collected in the Dean Stark apparatus when the pot temperature was raised to 103° C. Heating was stopped after distilling off a total of 100.0 g of distillates (pot temperature raised to 113° C.). (The reaction ran for 1 hour and 6 minutes from the time the catalyst was added at 80° C. until the quenching of the reaction mixture.) Next 0.2 mL of trioctylamine (neutralizer) was added to the flask under stirring and the resulting mixture was allowed to cool to room temperature. After the pot temperature was cooled down to room temperature, the flask with stirring rod and blade was weighed again (901.10 g). The NVC calculated based on the mass balance was 56.7% assuming that all of the polymer contents remained in the flask. The vinyl content of the polymer was 0.024%. The thiol content was calculated to be 0.00732%. This polymer was a bis-vinyl-terminated, mercaptopropyl-functionalized polydimethylsiloxane, PDMS(SH).

Grafting BMA: A solution of the PDMS(SH) prepared as described above in toluene (30.04 g of PDMS(SH), 22.66 g of toluene) was added to a 4-neck round-bottom flask. Butylmethacrylate (10 g) was added. The solution was heated to 85° C. A solution of the initiator, tBPPiv, in toluene (0.6 g tBPPiv in 5 g of toluene) was fed into the reaction mixture over 60 minutes. After 4 minutes of initiator feed, the solution became a hazy mixture. After 10 minutes, the reaction mixture appeared to be milk white. As the reaction proceeded, the viscosity of the reaction mixture increased. Following the end of the initiator feed, the reaction mixture was maintained at 85° C. for 80 minutes. 30 g of toluene was added at the end of the reaction to dilute the resulting mixture.

Scheme 3, as described above, produced PDMS(SH) with Mw/Mn 229KDa/133KDa and PDI 1.72. However, the subsequent attempt to graft BMA and in the presence of initiators resulted in the reduced Mw/Mn 76KDa/6.5KDa and PDI 11.82 in the resulting product.

Comparative Example 28—Attempting to Graft Polyacrylate Through a Mercapto Functionalized Vinyl PDMS The same PDMS(SH) prepared via Scheme 3 as described in Comparative Example 27, was used for grafting acrylate via a different reaction condition in this example. A solution of PDMS(SH) in toluene (114 g of PDMS(SH), 86 g of toluene) was added to a 4-neck round-bottom flask. Butylmethacrylate (4.5 g) and toluene (50 g) were added. The solution was heated to 85° C. A solution of the initiator, tBPPiv, in toluene (0.125 g tBPPiv in 10 g of toluene) was fed into the reaction mixture over 60 min. Following the end of the initiator feed, the reaction was maintained at 85° C. for 80 min. 60 g of toluene was added at the end of the reaction to dilute the polymer mixture. $^1$H NMR spectroscopic analysis showed only 19% conversion of BMA. GPC analysis showed no-little evidence for grafting. Table 6 shows the comparison between Comparative Examples 27 and 28.

TABLE 6

Comparison between Comparative Examples 15 and 16

| Conditions | Example 15 | Example 16 |
|---|---|---|
| PDMS(SH) (grams) | 22.7 | 114 |
| Monomer (grams) | BMA(10) | BMA (4.5) |
| Initiator | tBPPiv | tBPPiv |
| Initiator (grams) | 0.45 | 0.125 |
| Initiator (mmoles) | 2.58 | 0.54 |
| Thiol (mmoles) | 0.12 | 0.44 |
| Monomer (mmoles) | 70.3 | 31.65 |
| Graft Xn (target) | 601 | 71.2 |
| Graft Mn (target) | 85460 Da | 10121 Da |
| Monomer/initiator (mole ratio) | 27.2 | 58.6 |
| Thiol/initiator (mole ratio) | 0.05 | 0.81 |

Reference Example E—GPC Experimental Details

The molecular weight data was determined by analysis on a Waters 2695 model GPC. The poly(meth)acrylate grafted polyorganosiloxanes were dissolved in THF at a concentration of 5 mg solids/mL, and filtered through 0.45 μm PTFE syringe filters prior to injection of a 100 μL aliquot of the sample. The GPC was equipped with two Polymer Laboratories PLgel 5 μm Mixed-C columns (300 mm×7.5 mm), preceded by a PLgel 5 μm guard column (50 mm×7.5 mm) at a flow rate of 1.0 mL/min at 35° C. Detection was performed using a Waters 2410 differential refractive index detector. A conventional calibration of 16 narrow polystyrene standards covering the range of 580 g/mole to 2,300,000 g/mole and fit to a third order polynomial curve.

Reference Example F—General Procedure for Making and Curing Hydrosilylation Reaction Curable Compositions Samples prepared in Examples GP-1 through GP-4 and GP-8 through GP-10 were mixed with SiH Crosslinker, Resin 1, Karstedt's catalyst, and ETCH based on a typical weight ratio of 44.1:2.7:53.2:0.4:0.05, and then 10 mg of the mixture was placed in a hermetic DSC pan and sealed. The sample weight was recorded. The DSC run from RT to 200°

C. at 10° C./min. An exothermal peak between 10° and 120° C. was typically observed for the hydrosilylation of the vinyl groups with silanes.

For the Benchmark, a vinyl terminated vinyl siloxane was prepared using 1-liter 4-neck round-bottom flask with a stirring rod and blade was pre-weighed and recorded prior to the start of the experiment. 169.4 grams OH terminated PDMS 1, 5.56 grams of Vi-terminated PDMS 1, and 219.5 grams of toluene were charged into the flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 120° C. When the pot temperature reached 84° C., 0.47 mL of Phosphazene Catalyst 1 was added. As the reaction mixture continued to heat, the water, methanol, and toluene distillate was collected in a Dean Stark apparatus. Heating was discontinued after distilling 96.1 g of azeotrope. Then 0.20 mL of trioctylamine was added to the reaction flask under stirring to neutralize the reaction mixture and the resulting mixture was allowed to cool to room temperature. The round-bottom flask with stirring rod and blade was weighed and recorded. The NVC was then calculated to be 59% based on the mass balance (difference between pre-weight and final weight) assuming that all of the polymers content remained in the flask. The MW of the resulting polymer was 153 kDa and the PDI was 1.98. The composition was prepared according to the method outlined in Reference Example F.

Reference Example G—Film Sample Preparation

Create films: a sheet of paper was placed on a vacuum plate with vacuum on, then a sheet of release liner was placed on over the paper. The desired composition prepared as described above for Reference Example F was poured onto the release liner and a 4 mil bird bar was used to make a film. The film was placed in a Despatch™ oven at 150° C. for 5 minutes. After the sample was cooled a 2 inch×8½ strip was cut and transferred onto a glass substrate by using a ~5 pound roller.

Reference Example H—Haze and Clarity

Optical properties (haze and clarity) were measured of a film sample prepared according to Reference Example F on a glass substrate with a haze-gard plus instrument from BYK Gardner.

Reference Example I—NMR $^{29}$Si NMR spectra were acquired on an Agilent 500 MHz DD2 (mi-MR-06) system equipped with a 16 mm silicon free AutoX probe. The samples were prepared with CDCl$_3$+ 0.02M Cr(acac)$_3$ in a Si-free Teflon NMR tube. Standard parameters were applied except nt=1024. $^1$H NMR spectra were acquired on a Bruker Avance III HD NMR spectrometer equipped with a 5 mm TCI H C/Si cryoprobe (mi-MR-07). The samples were prepared with CDCl$_3$ in a 5 mm NMR tube. Standard parameters were applied.

Reference Example J—Synthesis of HSPrMe2SiOMe

A 3 M solution of CH$_3$MgBr in diethyl ether (50 mL, 0.15 mol) was added dropwise to a solution of 3-mercaptopropyltrimethoxysilane (8.5 g, 0.043 mol) in 50 mL of THF, while the temperature was kept between 0 and 10° C. The reaction mixture was stirred for 1 h at 0° C. and then treated dropwise with CH$_3$OH (40 mL). The solid was filtered. The crude material was used directly into the next reaction. 5.4 g was collected to give a 75% yield of pure product. NMR is consistent with the literature reference, Agina, E.V., ACS Applied Materials & Interfaces, 2015, 22,11755-11764.

INDUSTRIAL APPLICABILITY

There is an industry need to incorporate (meth)acrylic polymers and copolymers into polydiorganosiloxane (such as polydimethylsiloxanes) to increase interactions with substrate surfaces while retaining vinyl or other aliphatically unsaturated reactive functionality on the polydiorganosiloxanes that would be destroyed via free radical polymerization of an acrylic polymer onto the polydiorganosiloxane. The aliphatically unsaturated functionality will then be available for subsequent reactions (e.g., hydrosilylation cure). Without wishing to be bound by theory, it is thought that the poly(meth)acrylate grafted polyorganosiloxane described herein is useful in silicone pressure sensitive adhesive compositions. The hydrosilylation reaction curable composition, described above, may be useful as a pressure sensitive adhesive composition.

Definitions and Usage of Terms

Table 7 shows the abbreviations used herein.

TABLE 7

| Abbreviations | |
|---|---|
| Abbreviation | Definition |
| Da | Daltons |
| DSC | differential scanning calorimetry |
| g | grams |
| HS-GC | Headspace gas chromatography measured as described above |
| GPC | gel permeation chromatography |
| kDa | kilo Daltons |
| L | liters |
| mg | milligrams |
| MHz | megaHertz |
| min | minutes |
| mL | milliliters |
| mm | millimeters |
| mmole | millimoles |
| Mn | number average molecular weight determined by GPC |
| Mw | weight average molecular weight determined by GPC |
| MW | Molecular weight |
| NMR | nuclear magnetic resonance |
| NVC | non-volatile content |
| PDI | polydispersity determined by GPC |
| PDMS | polydimethylsiloxane |
| ppm | parts per million, by weight |
| RT | room temperature of 20° C. to 25° C. |
| μm | micrometer |

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

"Alkyl" means an acyclic, branched or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms.

"Alkenyl" means an acyclic, branched or unbranched monovalent hydrocarbon group having a double bond between two carbon atoms. Alkenyl is exemplified by, but not limited to vinyl, allyl, butenyl, pentenyl, and hexenyl, including branched and linear species.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

The term "(meth)acrylic acid" as used herein and in the appended claims is intended to serve as a generic expression embracing either or both of acrylic acid and methacrylic acid.

The term "(meth)acrylate" as used herein and in the appended claims is intended to serve as a generic expression embracing either or both of acrylate and methacrylate.

"M-unit" means a siloxane unit having formula $R_3SiO_{1/2}$, where each R independently represents a monovalent atom or organic group. "D-unit" means a siloxane unit having formula $R_2SiO_{2/2}$, where each R independently represents a monovalent atom or group. "T-unit" means a siloxane unit having formula $RSiO_{3/2}$, where each R independently represents a monovalent atom or group. "Q-unit" means a siloxane unit having formula $SiO_{4/2}$.

Embodiments of the Invention

In a first embodiment, a polyorganosiloxane having both aliphatically unsaturated groups and poly(meth)acrylate groups, comprises unit formula: $[R^3_w(R^5—S—R")(OR_4)_{(2-w)}Si—O_{1/2}]_p[R^3_v(R^5—S—R")(OR_4)_{(1-v)}Si—O_{2/2}]_q$ $[(R^5—S—R")Si—O_{3/2}]_k$ $(R^6R^7_2SiO_{1/2})_r(R^7_2SiO_{2/2})_s$ $(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a (meth)acrylate polymer or copolymer, each $R^6$ is an independently selected aliphatically unsaturated monovalent hydrocarbon group, each $R^7$ is an independently selected monovalent hydrocarbon group free of aliphatic unsaturation, subscript p 0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane.

In a second embodiment, in the polyorganosiloxane of the first embodiment, $R^3$ has 1 to 18 carbon atoms.

In a third embodiment, in the polyorganosiloxane of the first embodiment or the second embodiment, each $R^3$ is an alkyl group of 1 to 6 carbon atoms.

In a fourth embodiment, in the polyorganosiloxane of any one of the preceding embodiments, each $R^3$ is methyl.

In a fifth embodiment, in the polyorganosiloxane of any one of the preceding embodiments, $R^4$ has 1 to 6 carbon atoms.

In a sixth embodiment, in the polyorganosiloxane of any one of the preceding embodiments, each $R^4$ is methyl.

In a seventh embodiment, in the polyorganosiloxane of any one of the preceding embodiments, $R^5$ has 1 to 18 carbon atoms.

In an eighth embodiment, in the polyorganosiloxane of any one of the preceding embodiments, each $R^5$ is an independently selected alkylene group of 2 to 8 carbon atoms.

In a ninth embodiment, in the polyorganosiloxane of any one of the preceding embodiments, each $R^5$ is propylene.

In a tenth embodiment, in the polyorganosiloxane of any one of the preceding embodiments, each $R^6$ has 2 to 18 carbon atoms.

In an eleventh embodiment, in the polyorganosiloxane of any one of the preceding embodiments, each $R^6$ is an alkenyl group selected from vinyl, allyl and hexenyl.

In a twelfth embodiment, in the polyorganosiloxane of any one of the preceding embodiments, each $R^6$ is vinyl.

In a thirteenth embodiment, in the polyorganosiloxane of any one of the preceding embodiments, $R^7$ has 1 to 18 carbon atoms.

In a fourteenth embodiment, in the polyorganosiloxane of any one of the preceding embodiments, each $R^7$ is an alkyl group of 1 to 6 carbon atoms.

In a fifteenth embodiment, in the polyorganosiloxane of any one of the preceding embodiments, each $R^7$ is methyl.

In a sixteenth embodiment, in the polyorganosiloxane of any one of the preceding embodiments, R" has a has a DP of 1 to 1,000.

In a seventeenth embodiment, in the polyorganosiloxane of any one of the preceding embodiments, R" has a DP of 5 kDa to 600 kDa.

In an eighteenth embodiment, in the polyorganosiloxane of any one of the preceding embodiments, subscript (p+r+u)=2, subscript k=0, a quantity (p+q) is 1 to 100, a quantity (r+t) is 1 to 100, a quantity (p+q+r+s+t+u) is sufficient to provide a molecular weight of 50 kDa to 1,000 kDa to the polyorganosiloxane.

In a nineteenth embodiment, in the polyorganosiloxane of any one of the preceding embodiments, subscript p is 1 or 2.

In a twentieth embodiment, in the polyorganosiloxane of any one of the preceding the first to eighteenth embodiments, subscript p=0, subscript k=0, subscript t=0, and subscript u=0.

In a twenty-first embodiment, a method for making a product comprising a poly(meth)acrylate grafted polyorganosiloxane comprises the steps of:
I) combining starting materials comprising:
an alkoxysilyl-functional (meth)acrylate macromonomer;
a polydiorganosiloxane selected from the group consisting of
an unsaturated polydiorganosiloxane having, per molecule, at least one silicon bonded aliphatically unsaturated group;
a hydroxyl-functional polydiorganosiloxane having, per molecule, at least two silicon bonded hydroxyl groups; and
a combination of both the unsaturated polydiorganosiloxane and the hydroxyl-functional polydiorganosiloxane;
a phosphazene condensation reaction catalyst;
optionally a polydialkylsiloxane; and
optionally a solvent;
thereby making the product comprising the polyorganosiloxane and a by-product;
II) removing all or a portion of the by-product during and/or after step I);
optionally III) neutralizing the product; and
optionally IV) recovering the polyorganosiloxane.

In a twenty-second embodiment, in the method of the twenty-first embodiment, the alkoxysilyl-functional (meth) acrylate macromonomer is prepared by a method comprising:
1) combining starting materials comprising
i) a (meth)acrylate monomer of formula

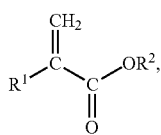

where $R^1$ is hydrogen or a methyl group and $R^2$ is selected from the group consisting of hydrogen, an alkyl group, an aryl group, and an aralkyl group;

ii) a mercapto-functional alkoxysilane of formula

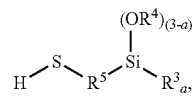

where subscript a is 0 to 2, each $R^3$ is an independently selected monovalent hydrocarbon group, $R^4$ is an independently selected alkyl group, and $R^5$ is a divalent hydrocarbon group;
optionally iii) a free radical initiator; and
optionally iv) a solvent; thereby making a product comprising an alkoxysilyl-functional (meth)acrylate macromonomer; and
optionally 2) recovering A) the alkoxysilyl-functional (meth)acrylate macromonomer.

In a twenty-third embodiment, in the method of the twenty-second embodiment, at least one of the following conditions is present:
in starting material i) each $R^1$ is methyl, and each $R^2$ is hydrogen or an alkyl group of 1 to 8 carbon atoms;
in starting material ii), subscript a is 1 to 2, each $R^3$ is an alkyl group of 1 to 6 carbon atoms, each $R^4$ is an alkyl group of 1 to 6 carbon atoms, and each $R^5$ is an alkylene group of 1 to 8 carbon atoms;
iii) the free radical initiator is present, and the free radical initiator is selected from the group consisting of iii-1) an azo compound, iii-2) a peroxide, and iii-3) a combination thereof;
iv) the solvent is present, and the solvent is selected from the group consisting of iv-1) a hydrocarbon with a boiling point above 100° C., iv-2) a polar solvent, iv-3) silicone oil, and iv-4) a combination of two or more of iv-1), iv-2), and iv-3).

In a twenty-fourth embodiment, in the method of the twenty-first embodiment, the alkoxysilyl-functional (meth) acrylate macromonomer has formula

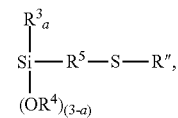

where subscript a is 0 to 2, each $R^3$ is an independently selected monovalent hydrocarbon group, $R^4$ is an independently selected alkyl group, $R^5$ is a divalent hydrocarbon group, and R" is a (meth)acrylate polymer or copolymer with a DP of 1 to 1,000.

In a twenty-fifth embodiment, in the method of the twenty-first embodiment, the unsaturated polydiorganosiloxane is present and has unit formula: $(R^6R^7{}_2SiO_{1/2})_b$ $(R^7{}_2SiO_{2/2})_c(R^6R^7SiO_{2/2})_d(R^7{}_3SiO_{1/2})_e[(R'O)R^7{}_2SiO_{1/2}]_f$ $[(R'O)R^7SiO_{2/2}]_g$, where each $R^6$ is an independently selected aliphatically unsaturated hydrocarbon group each $R^7$ is an independently selected monovalent hydrocarbon group free of aliphatic unsaturation, each R' is independently selected from the group consisting of H and $R^7$, subscript b is 0, 1 or 2, subscript e is 0, 1 or 2, subscript f is 0, 1 or 2, a quantity (b+e+f)=2, subscript c≥0, subscript d≥0, subscript g≥0, a quantity (c+d+g) is 1 to 250, a quantity (b+d)≥1, and a quantity (b+c+d+e+f+g) is at least 3.

In a twenty-sixth embodiment, in the method of the twenty-fifth embodiment, each $R^6$ has 2 to 18 carbon atoms.

In a twenty-seventh embodiment, in the method of the twenty-fifth or twenty-sixth embodiment, each $R^6$ is an alkenyl group selected from vinyl, allyl and hexenyl.

In a twenty-eighth embodiment, in the method of any one of the twenty-fifth to twenty-seventh embodiments, each $R^6$ is vinyl.

In a twenty-ninth embodiment, in the method of any one of the twenty-fifth to twenty-eighth embodiments, $R^7$ has 1 to 18 carbon atoms.

In a thirtieth embodiment, in the method of any one of the twenty-fifth to twenty-ninth embodiments, each $R^7$ is methyl.

In a thirty-first embodiment, in the method of the twenty-first embodiment, the hydroxyl-functional polydiorganosiloxane is present and has formula $(R^8{}_2SiO_{2/2})_h(R^8{}_3SiO_{1/2})_i(HOR^8{}_2SiO_{1/2})_j$, where each $R^8$ is an independently selected monovalent hydrocarbon group free of aliphatic unsaturation, subscript j is 0, 1 or 2, subscript i is 0, 1 or 2, a quantity (j+i)=2, subscript h≥1, and a quantity (h+i+j) is 3 to 250.

In a thirty-second embodiment, in the method of the twenty-first embodiment, the phosphazene condensation reaction catalyst is a phosphonitrile halide.

In a thirty-third embodiment, in the method of the twenty-first embodiment, step III) is present, and step III) comprises adding a neutralizing agent comprising an alkyl amine.

In a thirty-fourth embodiment, in the method of the twenty-first embodiment, step IV) is present, and step IV) comprises filtration, stripping, and/or distillation.

In a thirty-fifth embodiment, a curable composition comprises:
I) the polyorganosiloxane of any one of first to twentieth embodiments,
II) an organosilicon crosslinker having, per molecule, at least 3 silicon bonded hydrogen atoms,
III) a hydrosilylation reaction catalyst,
optionally IV) a hydrosilylation reaction inhibitor,
optionally V) a polyorganosilicate resin, and
optionally XX) a vehicle.

In a thirty-sixth embodiment, a method for making a coated substrate comprises:
A) forming a film of the composition of the thirty-fifth embodiment on a surface of the substrate, and
B) curing the composition to form a coating.

In a thirty-seventh embodiment, the coated substrate prepared by the method of the thirty-sixth embodiment, is a pressure sensitive adhesive article.

The invention claimed is:

1. A curable composition comprising:
I) a polyorganosiloxane having both aliphatically unsaturated groups and poly(meth)acrylate groups, wherein the polyorganosiloxane comprises unit formula: $[R^3{}_w(R^5\text{—S—R''})(OR^4)_{(2-w)}Si\text{—}O_{1/2}]_p[R^3{}_v(R^5\text{—S—R''})(OR^4)_{(1-v)}Si\text{—}O_{2/2}]_q[(R^5\text{—S—R''})Si\text{—}O_{3/2}]_k(R^6R^7{}_2SiO_{1/2})_r(R^7{}_2SiO_{2/2})_s(R^6R^7SiO_{2/2})_t(R^7{}_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a (meth)acrylate polymer or copolymer, each $R^6$ is an independently selected aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane;
II) an organosilicon crosslinker having, per molecule, at least 3 silicon bonded hydrogen atoms; and
III) a hydrosilylation reaction catalyst.

2. The curable composition of claim 1, where in the unit formula for the polyorganosiloxane $R^3$ has 1 to 18 carbon atoms, $R^4$ has 1 to 6 carbon atoms, $R^5$ has 1 to 18 carbon atoms, $R^6$ has 2 to 18 carbon atoms, and $R^7$ has 1 to 18 carbon atoms, R" has a has a DP of 1 to 1,000; subscript (p+r+u)=2, subscript k=0, a quantity (p+q) is 1 to 100, a quantity (r+t) is 1 to 100, a quantity (p+q+r+s+t+u) is sufficient to provide a molecular weight of 50 kDa to 1,000 kDa to the polyorganosiloxane.

3. The curable composition of claim 2, where subscript p is 1 or 2, each $R^3$ is an alkyl group of 1 to 6 carbon atoms, each $R^4$ is an alkyl group of 1 to 6 carbon atoms, each $R^5$ is an alkylene group of 2 to 8 carbon atoms, each $R^6$ is an alkenyl group selected from vinyl, allyl and hexenyl, and each $R^7$ is an alkyl group of 1 to 6 carbon atoms.

4. The curable composition of claim 3, where each $R^3$ is methyl, each $R^4$ is methyl, each $R^5$ is propylene, each $R^6$ is vinyl, R" has a DP of 5 to 600, and each $R^7$ is methyl, and subscript p is 1 or 2.

5. The curable composition of claim 1, where II) the crosslinker comprises a polyorganohydrogensiloxane of

$$R^{13}{}_3SiO(R^{13}{}_2SiO)_{aa}(R^{13}HSiO)_{bb}SiR^{13}{}_3, \quad \text{Formula II-1}$$

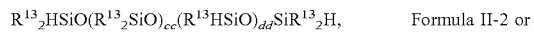

$$R^{13}{}_2HSiO(R^{13}{}_2SiO)_{cc}(R^{13}HSiO)_{dd}SiR^{13}{}_2H, \quad \text{Formula II-2 or}$$

a combination thereof; where
subscript aa has an average value ranging from 0 to 2000,
subscript bb has an average value ranging from 2 to 2000,
subscript cc has an average value ranging from 0 to 2000, and
subscript dd has an average value ranging from 0 to 2000, and
each $R^{13}$ is independently a monovalent hydrocarbon group.

6. The curable composition of claim 1, where III) the hydrosilylation reaction catalyst comprises Karstedt's Catalyst.

7. The curable composition of claim 1, further comprising an ingredient selected from the group consisting of IV) a hydrosilylation reaction catalyst inhibitor, V) a polyorganosilicate resin, VI) a spacer; VII) an extender, a plasticizer, or a combination thereof; VIII) a filler; IX) a filler treating agent; X) a biocide; XI) a flame retardant; XII) a surface modifier; XIII) a chain lengthener; XIV) an endblocker; XV) a flux agent; XVI) an anti-aging additive; XVII) a pigment; XVIII) an acid acceptor; XIX) a rheological additive; XX) a vehicle (e.g., a solvent or diluent); XXI) a surfactant; XXII) a corrosion inhibitor, and a combination thereof.

8. The curable composition of claim 1, further comprising IV) a hydrosilylation reaction inhibitor; V) a polyorganosilicate resin; and XX) a vehicle.

9. The curable composition of claim 8, where he hydrosilylation reaction inhibitor comprises an acetylenic alcohol.

10. The curable composition of claim 8, where the polyorganosilicate resin comprises formula $(R^{15}{}_2R^{16}SiO_{1/2})_x(R^{15}{}_3SiO_{1/2})_y(SiO_{4/2})_z$, where $R^{15}$ is an alkyl group, an aryl group, or an aralkyl group, and $R^{16}$ is an alkenyl group of 2 to 18 carbon atoms, subscript x≥0, subscript y≥0, subscript z≥0, a quantity (x+y)≥0, and subscripts x, y, and z have values such that 0.9≤(x+y)/z≤1.3.

11. The curable composition of claim 8, where the vehicle comprises tetrahydrofuran, toluene, heptanes, or a combination thereof.

12. A method for making a coated substrate comprising:
A) forming a film of the composition of claim 1 on a surface of the substrate, and
B) curing the composition to form a coating.

* * * * *